United States Patent [19]

Inoue

[11] Patent Number: 4,616,796

[45] Date of Patent: Oct. 14, 1986

[54] MAGNETIC RETAINER ASSEMBLY

[75] Inventor: Kiyoshi Inoue, Tokyo, Japan

[73] Assignee: Inoue-Japax Research Incorporated, Kanagawa, Japan

[21] Appl. No.: 364,407

[22] Filed: Apr. 1, 1982

[30] Foreign Application Priority Data

Jul. 23, 1981 [JP] Japan .................. 56-109966
Jul. 23, 1981 [JP] Japan .................. 56-109967

[51] Int. Cl.⁴ .................................. F16B 47/00
[52] U.S. Cl. .................. 248/206.5; 248/309.4; 269/8; 335/285; 335/295
[58] Field of Search .............. 248/206.5, 309.4; 211/DIG. 1; 403/DIG. 1; 335/295, 285; 269/8

[56] References Cited

U.S. PATENT DOCUMENTS

| | | | |
|---|---|---|---|
| 1,180,457 | 4/1916 | Walker | 269/8 X |
| 1,232,512 | 7/1917 | Downes et al. | 269/8 X |
| 1,595,692 | 8/1926 | Simmons . | |
| 1,754,587 | 4/1930 | Weydell . | |
| 2,286,238 | 6/1942 | Simmons | 335/295 |
| 2,319,270 | 5/1943 | Simmons | 269/8 X |
| 2,346,193 | 4/1944 | Simmons | 269/8 X |
| 2,609,430 | 9/1952 | Bower | 335/295 |
| 2,690,527 | 9/1954 | Bohli . | |
| 2,787,874 | 4/1957 | Blood et al. . | |
| 2,972,485 | 2/1961 | Ferchland . | |
| 3,258,658 | 6/1966 | Vaughn . | |
| 3,581,873 | 6/1971 | Spoyig . | |
| 3,665,354 | 5/1972 | Werner | 335/295 |
| 3,665,355 | 5/1972 | Sasaki et al. . | |

FOREIGN PATENT DOCUMENTS

| | | |
|---|---|---|
| 1179653 | 10/1964 | Fed. Rep. of Germany . |
| 1226397 | 10/1966 | Fed. Rep. of Germany . |
| 1029480 | 6/1953 | France . |
| 1426389 | 12/1965 | France . |
| 450541 | 7/1936 | United Kingdom . |
| 768033 | 2/1957 | United Kingdom . |
| 844999 | 8/1960 | United Kingdom . |

Primary Examiner—J. Franklin Foss
Assistant Examiner—David L. Talbott
Attorney, Agent, or Firm—Karl F. Ross; Herbert Dubno

[57] ABSTRACT

According to the present invention there is provided a magnetic retainer assembly adapted for selective attachment to and detachment from a magnetic object, which assembly comprises: a plurality of permanent magnet members of a uniform shape and size arranged regularly in a predetermined set of positions in the assembly for individually producing magnetic fields of a uniform field strength; support means in the assembly for holding the permanent magnet members securely therein and positioning said members spaced apart from one another in an essentially magnetically insulating relationship; and magnetic path-forming means in the support member for providing a magnetic path for each of the permanent magnet members to be magnetically conducted with the magnetizable object, thereby magnetically securing the assembly to the object.

37 Claims, 55 Drawing Figures

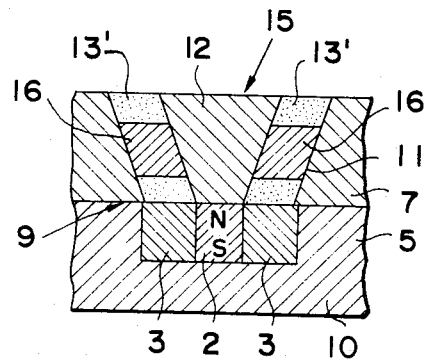
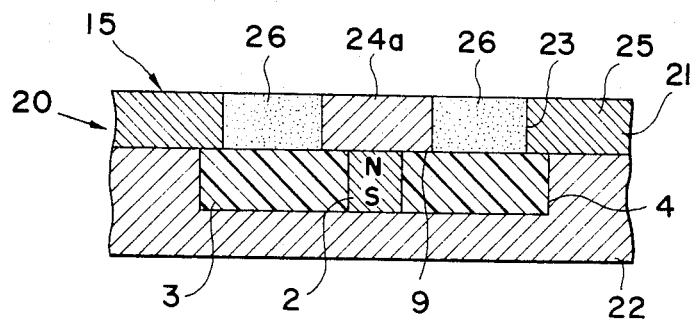
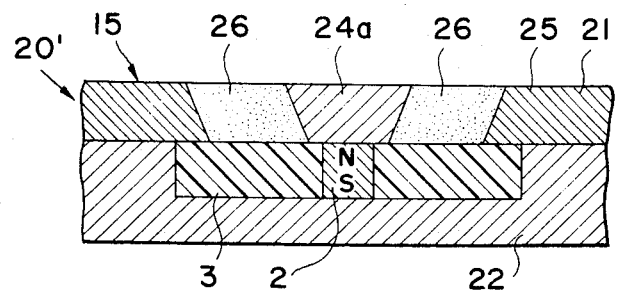

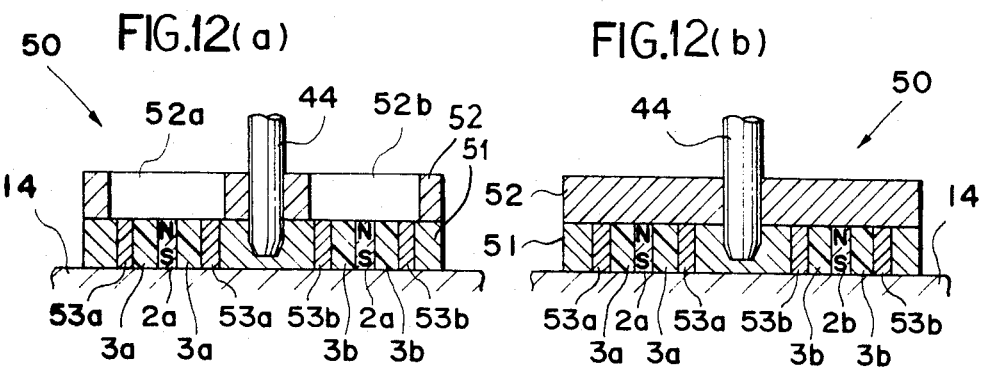
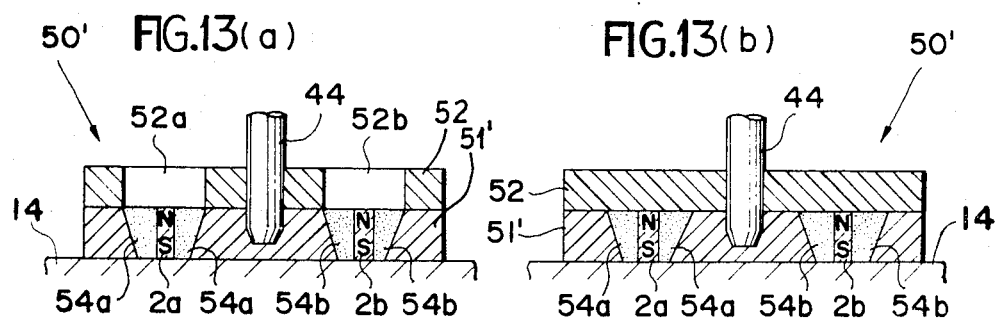
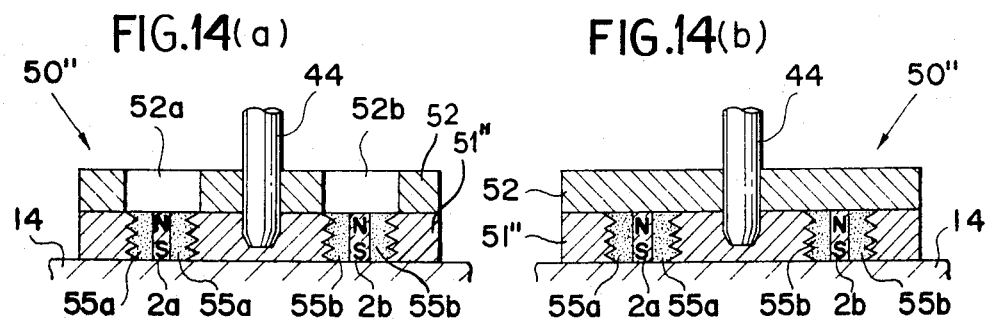

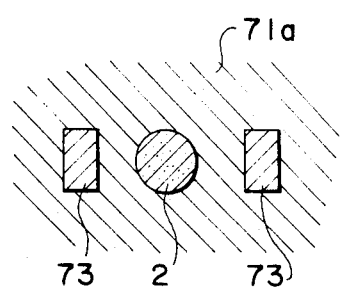
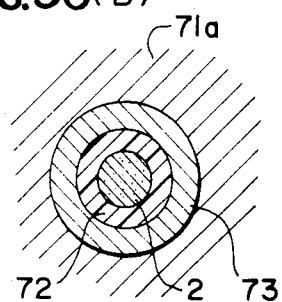
FIG.30(A) FIG.30(B)
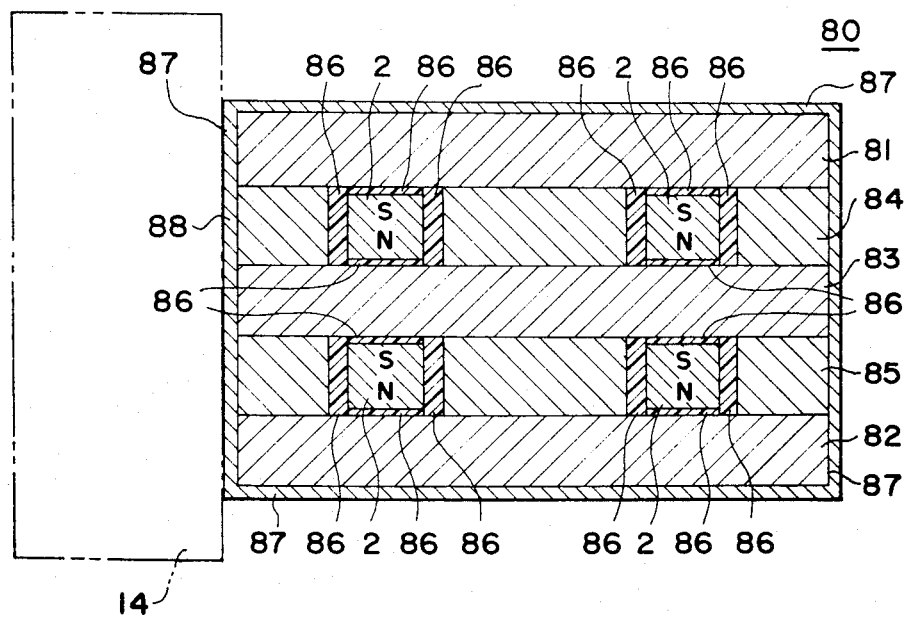
FIG. 31

MAGNETIC RETAINER ASSEMBLY

FIELD OF THE INVENTION

The present invention relates generally to magnetic retainers and, in particular, to a new and improved magnetic retainer assembly adapted for selective attachment to and detachment from a magnetic object such as a workpiece or a portion of a machine tool. Magnetic retainers according to the invention may be used, for example, as a magnetic base adapted to be magnetically secured to an object for supporting a measuring instrument such as a dial gauge with a post or arm member provided thereon, or as a magnetic chuck or grip for holding against gravitational drop an unsupported portion of a workpiece being progressively severed by cutting. The invention relates further to a deformable magnetic retainer assembly which can withstand a high degree of deformation and can readily be stuck to a magnetizable object or objects to hold it or retain them together.

BACKGROUND OF THE INVENTION

In a conventional magnetic retainer, e.g. a magnetic base, adapted to be magnetically secured on a magnetizable object, a limited size of its base member has considerably restricted the magnetic attraction attainable between a permanent magnet accommodated therein and the object. The use of a larger base member in an attempt to increase the magnetic attraction renders the whole assembly undesirably heavy and bulky, making it inadequate or inconvenient for easy handling by the operator. In addition, the conventional magnetic base, which is of block form, is relatively unstable when placed on an object for supporting a post or arm member to which a relatively large or heavy measuring instrument is mounted. Furthermore, a considerable reduction in the attractive capability of the permanent magnet has been encountered with the prior-art magnetic retainer assembly while in use in which attachment and detachment are repeated.

It should also be noted that needs exist for deformable magnetic retainers which can readily be applied to, for example, a corrugated surface of a magnetizable object to magnetically retain it or an angular junction of two or more magnetizable parts to magnetically hold them together, or to nip a magnetizable article on its two opposed surfaces to magnetically grip it. Conventional deformable magnetic retainers employ a deformable material in which particles of a permanent magnet material are uniformly distributed. These retainers have, however, been of limited utility because of their inability to undergo a high degree of deformation. When subjected to such deformation, cracks tends to form therein. Furthermore, the known deformable magnetic retainers are either relatively short in serve life or poor in magnetic attaction capability.

OBJECTS OF THE INVENTION

It is, accordingly, a principal object of the present invention to provide a new, improved and useful magnetic retainer assembly which is much more efficient and superior in operating performance than existing magnetic retainer assemblies.

Another important object of the present invention is to provide a magnetic retainer assembly which is less susceptible to demagnetization or a reduction in magnetic attraction capability, or greater in service life than prior magnetic retainer assemblies.

Yet another object of the invention is to provide a magnetic retainer assembly which is deformable, and which is much greater in deformability without damaging, greater in service life and yet much greater in magnetic attraction capability than conventional magnetic retainer assemblies of deformable type.

SUMMARY OF THE INVENTION

According to the present invention there is provided a new, improved and useful magnetic retainer assembly adapted for selective attachment to and detachment from, a magnetic object, which assembly comprises: a plurality of permanent magnet members of a uniform shape and size arranged regularly in a predetermined set of positions in the assembly for individually producing magnetic fields of a uniform field strength; support means in the assembly for holding the permanent magnet members securely therein and positioning said members spaced apart from one another in an essentially magnetically insulating relationship; and magnetic path-forming means in the support member for providing a magnetic path for each of the permanent magnet members to be magnetically conducted with the magnetizable object, thereby magnetically securing the assembly to the object.

Specifically, each of the permanent magnet members may be columnar in shape, e.g. rectangular, cylindrical or disk-shaped with two opposed parallel end surfaces having an equal area and forming N- and S-pole surfaces. Each permanent magnet member should preferably be constituted by a unitary body of a rare earth-cobalt permanent magnet material although any other permanent magnet material may also be used.

The support means may be constituted by a base member in the form of a circular disk, or square or rectangular plate composed of a non-magnetic or paramagnetic material in which permanent magnetic members are embedded at positions equi-distantly spaced apart about a center thereof. Alternatively, the base member may be composed of a semi-magnetic material constituted by a mixture of magnetic particles and a non-magnetic material such as a synthetic resin.

BRIEF DESCRIPTION OF THE DRAWING

These and many other features of the present invention as well as advantages and objects thereof will become more readily apparent from reading of the following description of certain preferred embodiments thereof, taken with reference to the accompanying drawing in which:

FIG. 4 is a side cross-sectional view of a portion of a modification of the assembly of FIG. 1;

FIG. 7 is a side cross-sectional view of the assembly of FIG. 6 taken along the line VII—VII;

FIG. 8 is a similar view diagrammatically illustrating a modification of the structure of the assembly of FIG. 7;

FIGS. 12(a) and 12(b) are side cross-sectional views of the magnetic base of FIGS. 11(a) and 11(b) taken along the lines A—A and B—therein, respectively;

FIGS. 13(a) and 13(b) are similar views diagrammatically illustrating a modification of the magnetic base of FIGS. 12(a) and 12(b) when it is magnetically deactuated and actuated, respectively;

FIGS. 14(a) and 14(b) are similar views diagrammatically illustrating a further modification of the magnetic base of FIGS. 13(a) and 13(b) when it is magnetically deactuated and actuated, respectively;

FIG. 8 is a side cross-sectional view of the magnetic base of FIG. 15 when it is magnetically actuated;

FIGS. 30(A) and 30(B) are horizontal cross-sectional views illustrating different arrangements of each permanent magnet in the assembly of FIG. 29;

FIG. 31 is a longitudinal cross-sectional view of a further magnetic retainer assembly of the present invention;

SPECIFIC DESCRIPTION

Figure 1:
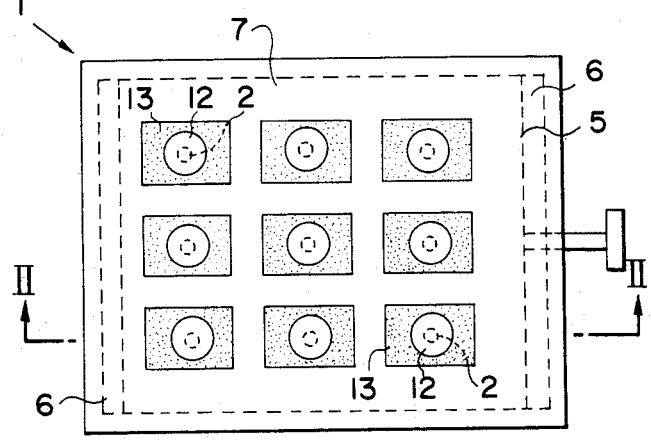
FIG. 1 is a top plan view diagrammatically illustrating a magnetic retainer assembly according to the invention.
Figure 2:
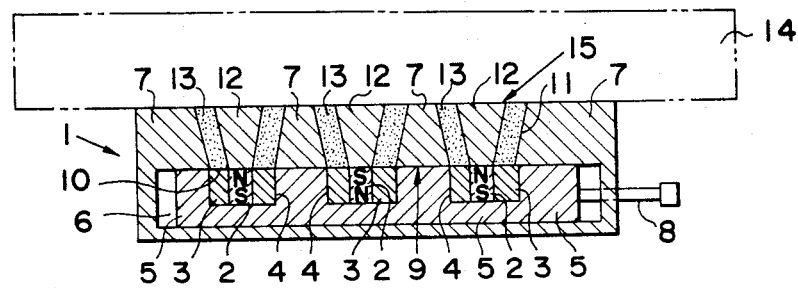
FIG. 2 is a side cross-sectional view of the assembly of FIG. 1 taken along the line II—II when the assembly is magnetically actuated to retain a magnetic object thereof.
Figure 3:
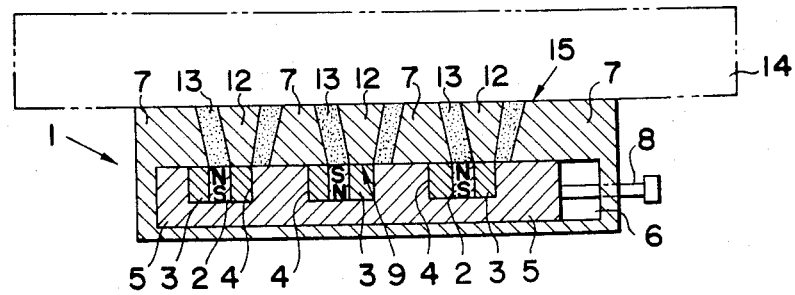
FIG. 3 is a similar view when the assembly is magnetically deactuated to allow the object to be detached therefrom or to be freely movable thereon.

Referring first to FIGS. 1–3, a magnetic retainer assembly 1 according to the invention makes use of a plurality of permanent magnet bodies 2 which may each be columnar in shape and fittedly accomodated in a non-magnetic cylinder 3 coaxial therewith. The non-magnetic cylinders 3, composed of, say, a plastic, are, in turn, fittedly accommodated in recesses 4 formed in a rectangular ferromagnetic plate 5 which may be composed of iron and is slidably received in a compartment 6 formed in a rectangular ferromagnetic block 7 which may also be composed of iron. The ferromagnetic plate 5 is movable slidably in the compartment 6 from right to left and vice versa as viewed in the drawing by means of a handle 8. One pole, N- or S-pole, of each permanent magnet 2 is arranged in flush with the upper wall 9 of the ferromagnetic plate 5 and the upper face 10 of each non-magnetic cylinder 3. The ferromagnetic block 7 is formed with openings 11 each of which extends from its upper surface into the compartment 6, is tapered so as to be upwardly divergent and may be rectangular in cross section. Each tapered opening 11 accepts a ferromagnetic core member 12 (e.g. iron) coaxially therewith, which is in the form of a truncated cone with the peripheral surface spaced from the tapered opening 11 by a gap which is filled with a non-magnetic or semi-magnetic material 13. The filling 13 when to be non-magnetic may be composed of a synthetic resin or adhesive material and when to be semi-magnetic may be composed of such a non-magnetic material mixed with particles of a magnetic material such as iron, a ferrite or an amorphous magnetic metal or alloy. The filling 13 is bonded to either the ferromagnetic block 7 of the ferromagnetic core member 12 or both. The ferromagnetic block 7 is shown located below a magnetizable object 14 such as a plate workpiece in contact with the lower surface 15 thereof. It will be seen that when the ferromagnetic plate 5 within the compartment 6 is moved to the position shown in FIG. 2, the core member 12 having its upper surface in contact with the magnetizable object 14 comes to bring its lower surface in contact with one pole of each permanent magnet 2 whose other pole is connected with the object 14 via the ferromagnetic plate 5 and the ferromagnetic block 7. A closed magnetic circuit is thus established individually for each permanent magnet 2 which individually produces a magnetic field, whereby the assembly 1 is magnetically secured to the magnetized object 14. In this state, each of the plural permanent magnets 2 is located coaxially with the corresponding tapered opening 11 and hence with the corresponding core or pole member 12. The plural permanent magnets 2 are of a uniform shape and size and are composed of a same material to individually produce magnetic fields of a uniform intensity. Accordingly, uniform forces of magnetic attraction are developed at uniformly distributed locations in the interface 15 between the ferromagnetic block 7 and the magnetic object 14. The result is a highly stabilized and firm retention of the assembly 1 to the object 14 or vice versa. When the ferromagnetic plate 5 is moved to the position shown in FIG. 3, the upper pole of each permanent magnet 2 comes below the non-magnetic or semi-magnetic filling 13. The magnetic circuit which has been established is thus broken or substantially broken individually for each permanent magnet 12, permitting the assembly 1 to be readily detached from the magnetic object 14. In case the assembly 1 is fixed, the object 14 can be detached from or becomes readily displaceable on the upper surface 15 of the ferromagnetic block 7. It will be understood that each pole area of each permanent magnet 2 should be substantially equal to or not greater than the lower end area of each core member 12 and should not be greater than the width of the filling or gap 13. The use of a semi-magnetic material, rather than a non-magnetic material, to fill the gap 13 between the ferromagnetic core member 12 and block 7 is advantageous in preventing each permanent 2 from demagnetizing or progressively losing its magnetic attractive power through its repeated attachment and detachment with the magnetizable object 14. The upwardly divergent tapered formations of both the core member 12 and the opening 11 are found to assure an increased setting accuracy of the member 12 and the filling 13 in the opening 11.

FIG. 4 shows a modified arrangement in which the tapered ferromagnetic core or pole member 12 is supported in the tapered opening 11 formed in the ferromagnetic block 7. In this arrangement, a tapered ring 16 composed of a non-magnetic metal such as copper, brass or stainless steel is seated on the tapered walls of the opening 11 to support the tapered core or pole member 12. A non-magnetic or semi-magnetic material as mentioned above can then be injected from above and below to fill the remaining spaces 13' between the ferromagnetic block 7 and core or pole member 12. An increased positioning accuracy of the member 12 within the opening 11 is here again attained.

Figure 5:
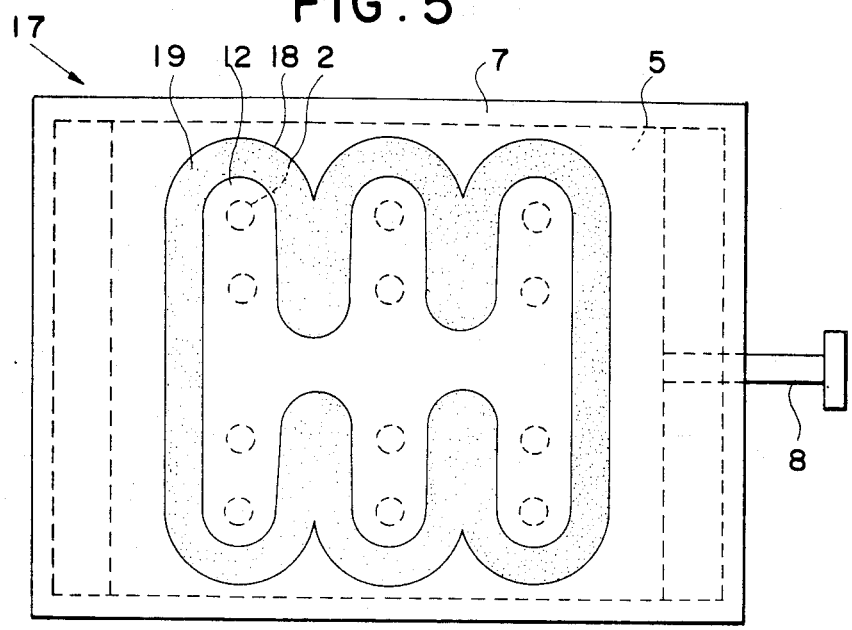
FIG. 5 is a top plan view diagrammatically illustrating a further magnetic retainer assembly according to the invention.

In a magnetic retainer assembly 17 shown in FIG. 5, a continuous groove 18 is formed in a portion of the rectangular ferromagnetic block 7 above the compartment 6 (FIGS. 2 and 3) in which the rectangular ferromagnetic plate 5 is slidably received as previously described. The groove 18 is filled with a non-magnetic or semi-magnetic material 19 of the type previously described. In the rectangular plate 5 twelve permanent magnets 2 are shown as embedded in a manner as described previously. In this embodiment, a portion of the ferromagnetic block 7 inside the groove 18 is designed to constitute a unitary pole member 12 for the permanent magnets 2 so that when the plate 5 lies in the position shown, each permanent magnet 2 is allowed to establish a closed magnetic circuit with the pole member 12, a magnetizable object 14 (not shown), a portion of the block 7 outside the groove 18 and the plate 5, thereby magnetically attaching the assembly 17 firmly to the object 14. When the plate 5 is moved right or left by maneuvering the handle 8 to such a position that the permanent magnets 2 are located immediately below the groove 18 and hence below the filling 19, the magnetic circuits are broken to release the object 14 from the assembly 17.

Figure 6:
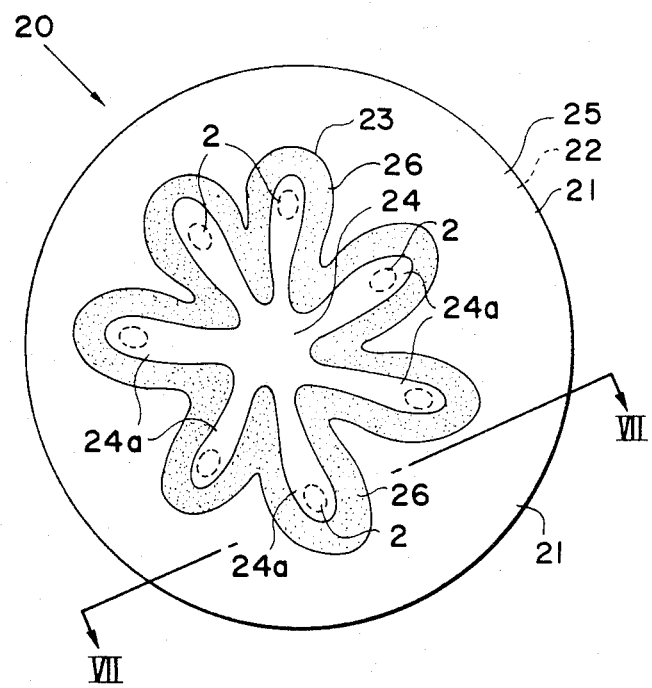
FIG. 6 is a similar view diagrammatically illustrating a further magnetic retainer assembly according to the invention.

A magnetic retainer assembly 20 of the invention shown in FIGS. 6 and 7 comprises an upper member 21 mounted on a lower member 22 in intimate contact therewith at an interface 22a. Both members 21 and 22 may be disk plates as apparent from FIG. 6 and are composed of a ferromagnetic material. The disk plate constituting the upper member 21 is formed with a starfish-like groove 23 as shown and is thereby divided into an inner portion 24 and an outer portion 25. The groove 23 is filled with a non-magnetic material or semi-magnetic material 26 as specified previously which here serves to firmly bridge the inner and outer portions 24 and 25 of the upper member 21. The inner and outer portions 24 and 25 are accordingly formed with outer and inner contours, respectively, each of which is of starfish shape. The inner portion 24 is here formed with seven projections 24a, at end zones of which are seen seven permanent magnets 2, respectively. In this state, each permanent magnet 2 is located directly below the corresponding end portion 24a as shown in FIG. 7. The permanent magnet 2 being again columnar in shape and having opposite poles (N and S) at its upper and lower end faces, respectively, is embedded in a non-magnetic or semi-magnetic disk 3 at a center thereof so that the upper and lower end faces of the permanent magnet 2 are flush with the upper and lower surfaces of the disk 3, respectively. The disk 3 is, in turn, fittedly seated in a cylindrical cavity 4 formed in the disk plate constituting the lower member 22 so that the upper surface of the disk 3 is flush with the upper surface of the lower member 22. It will be seen that in this state, a magnetic path for the permanent magnet 2 is established and maintained through the projection 24a, a magnetizable object (not shown) to be retained on the surface 15, the upper plate 22 and the lower plate 22. The lower plate 22 is here arranged to be rotatable relative to the upper disk 21 about their common axis. When the lower disk 22 is rotated clockwise or counterclockwise to a position in which each permanent magnet 2 is located directly below the filling 26, the object is magnetically released from the assembly 20 or vice versa.

FIG. 8 shows a modification of the structure of FIG. 7 in which the outer and inner portions 24 and 25 of the upper member 21 are so cut as to form a starfish-like groove 26 such that its outer and innner flanks are tapered so as to be divergent upwardly and downwardly, respectively, to provide a modified sectional structure of the assembly 20′ similar to that of the assembly 1 shown in FIG. 3 and to achieve the essentially same functions previously described in connection therewith.

The inner and outer portions 24 and 25 of the upper member 21 divided by the starfish-like groove 26 can readily be prepared from a single disk plate by, for example, a traveling-wire electroerosion machine utilizing a continuous electrode wire continuously advanced axially through the disk plate. Electroerosion machining current is applied between the traveling wire and the disk plate while the traveling axis of the electrode wire and the disk plate is relatively displaced orthogonally to the traveling axis along a predetermined cutting path to achieve first the desired outer starfish-like contour of the inner portion 24 or the desired inner starfish-like contour of the outer portion 25. After removing one of these severed portions, the remaining portion is further subjected to traveling-wire electroerosion cutting operation to yield the desired inner starfish-like contour of the outer portion 25 or the desired outer starfish-like contour of the inner portion 24. The two machined portions are then positioned and the filling 26 is applied in the interstice or groove 26 to firmly bridge the two portions 24 and 25 together to yield a finished upper member 21 as shown in FIG. 6. The desired tapered flanks as shown in FIG. 8 are readily obtained by inclining the traveling electrode wire with respect to the disk plate at an angle corresponding to the desired angle of taper.

Figure 9:
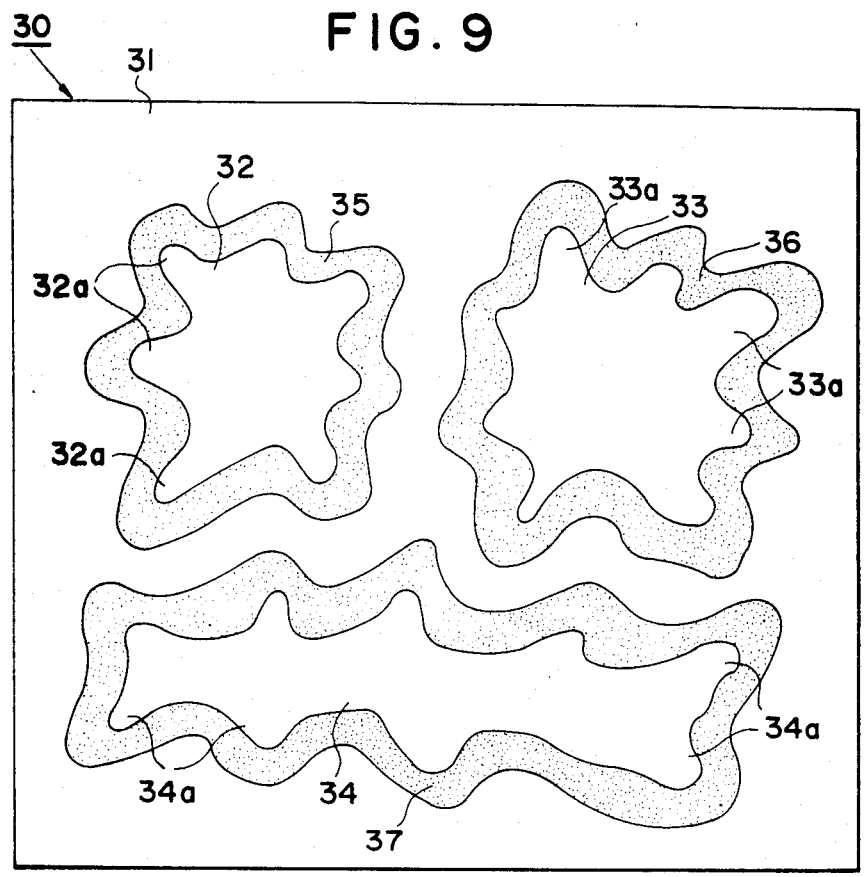
FIG. 9 is a top plan view diagrammatically illustrating a modification of the assembly of FIG. 6.

A magnetic retainer assembly 30 shown in FIG. 9 makes use of a rectangular plate 31 composed of a ferromagnetic material and having three inner portions 32, 33 and 34 separated by three shaped grooves 35, 36 and 37, respectively, from the outer portion of the plate 31. Each of the grooves 35, 36 and 37 is filled with a non-magnetic or semi-magnetic material as previously described. Permanent magnets (not shown) are embedded in a lower plate (not shown) at respective positions corresponding to zones of projection 32a of the inner portion 32, zones of projection 33a of the inner portion 33 and zones of projections 34a of the inner portion 34 as previously described.

Figure 10:
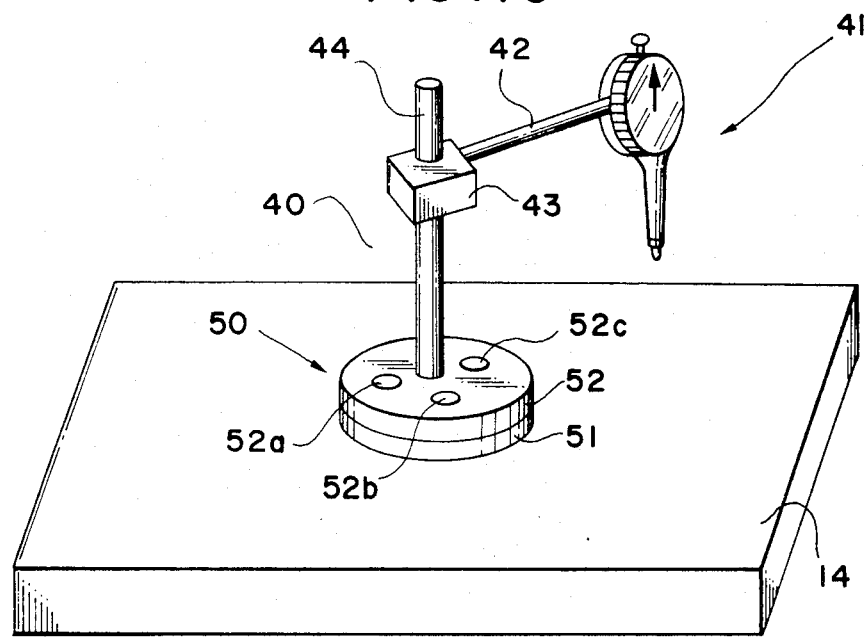
FIG. 10 is a perspective view diagrammatically illustrating a magnetic stand incorporating an embodiment of the invention in a base thereof.

FIG. 10 shows a magnetic retainer assembly 50 according to the invention used as a base of a magnet stand 40 for supporting a measuring instrument such as a dial gauge 41 on a magnetizable object 14 such as a ferrous workpiece. The gauge 41 is shown supported by an arm 42 secured to a block 43 which is slidably movable on a post 44 and can be secured thereto at a desired vertical position by a fixing means not shown.

Figure 11A:
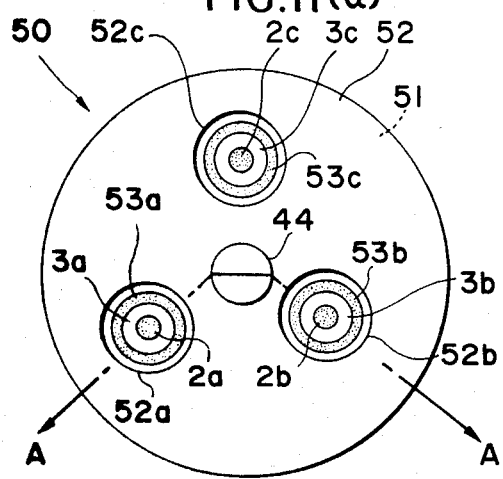
FIGS. 11(a) and 11(b) are top plan views of the magnetic base of FIG. 11 when it is magnetically deactuated and actuated, respectively.
Figure 11B:
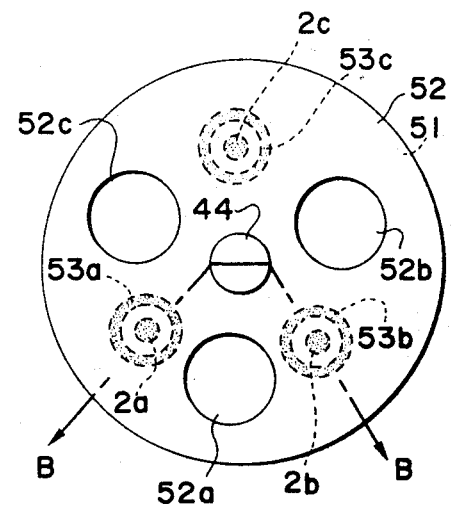

The magnet base 50 comprises a base disk plate 51 adapted to be placed on the magnetizable object 14 in intimate contact therewith and an upper disk plate 52 coaxially placed on the base disk plate 51 in intimate contact therewith. As shown in FIG. 10, the post 44 extends into the upper disk 52 which has three circular openings 52a, 52b and 52c which, as shown in FIG. 11, are positioned symmetrically about the post 44. The post 44 is secured to the base disk 51 whereas the upper disk 52 is arranged to be turnable about the post 44 relative to the fixed base disk 51. The upper disk 52 is composed of a ferromagnetic material whereas the base disk 51 is composed of a non-magnetic material. The post 44 is likewise composed of a non-magnetic material. Referring to FIG. 11(a), three small permanent magnets 2a, 2b and 2c composed of a rare-earth/cobalt material are seen located coaxially with and exposed through the openings 52a, 52b and 52c, respectively. Referring also to FIG. 12(a), each of the permanent magnets 2a–2c is cylinder-columnar in shape having two opposed poles (N and S) at its parallel upper and lower faces and is fittedly retained with a cylinder 3a, 3b, 3c of a non-magnetic or semi-magnetic material as previously specified. The cylinder 3a, 3b, 3c is, in turn, fittedly retained in a cylinder 53a, 53b, 53c of a ferromagnetic material which is in turn embedded in the base disk 51 of non-magnetic material.

When the upper plate 52 is in the position shown in FIGS. 11(a) and 12(a), it will be seen that each of the openings 52a, 52b and 52c provides an air gap of large reluctance such that the assembly 50 can readily be detached from the retaining plate object 14. When the upper plate 52 is turned to the position shown in FIGS. 11(b) and 12(b), the openings 52a, 52b and 52c are removed from the upper faces of the permanent magnets 2a–2c so that each of the magnets 2 can establish a magnetic path of high flux conductance through the upper disk 52, the ferromagnetic cylinder 53 and the magnetic object 14, thereby firmly locking the assembly 50 onto the magnetized object 14.

In a modified magnetic base 50′ shown in FIGS. 13(a) and 13(b), not only an upper disk 52 formed with openings 52a, 52b and 52c but a base disk 51′ is composed of a ferromagnetic material and each of permanent magnets 2a, 2b and 2c is retained in a non-magnetic or semi-magnetic material filled in an opening 54a, 54b, 54c which is formed in the ferromagnetic base disk 51′ and is preferably tapered as shown for the reason previously noted. The filling to accommodate the permanent magnet in each tapered opening is preferably composed of a semi-magnetic material.

The semi-magnetic material for use in the practice of the invention preferably comprises an adhesive of, say, epoxy-family, phenol-family, acryl-family, styrene-family, or cyane-famile in which particles composed of a ferromagnetic material such as iron, permalloy, sendust or amorphous magnetic metal are uniformly distributed. The magnetic particles should be of a particle size ranging between 0.1 and 50 microns. Tapes of magnetic material, say, of a thickness of 5 microns and a length of 10 mm may also be used. Furthermore, particles of a permanent magnetic material such as a ferrite, an iron-chromium-cobalt alloy or a rare-earth/cobalt material are useful.

In a further modification 50″ of FIGS. 14(a) and 14(b), each opening 55a, 55b, 55c formed in a ferromagnetic base disk 51″ to be filled with the semi-magnetic material to accommodate the permanent magnet 2a, 2b, 2c is formed with a saw-toothed wall as shown. Such rugged formations in the cylindrical wall of each opening is advantageous in firmly retaining the semi-magnetic material or adhesive injected and set therein to retain the permanent magnet 2a, 2b, 2c.

Figure 16:
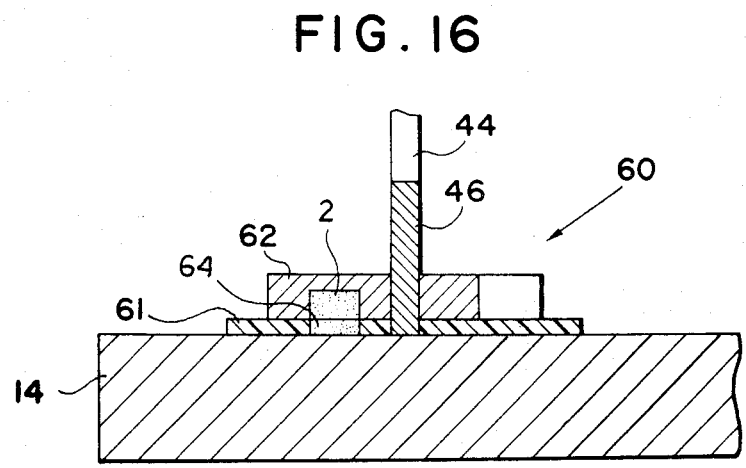
FIG. 16 is a side cross-sectional view of the magnetic base of FIG. 15 taken along the line XVI—XVI therein.
Figure 15:
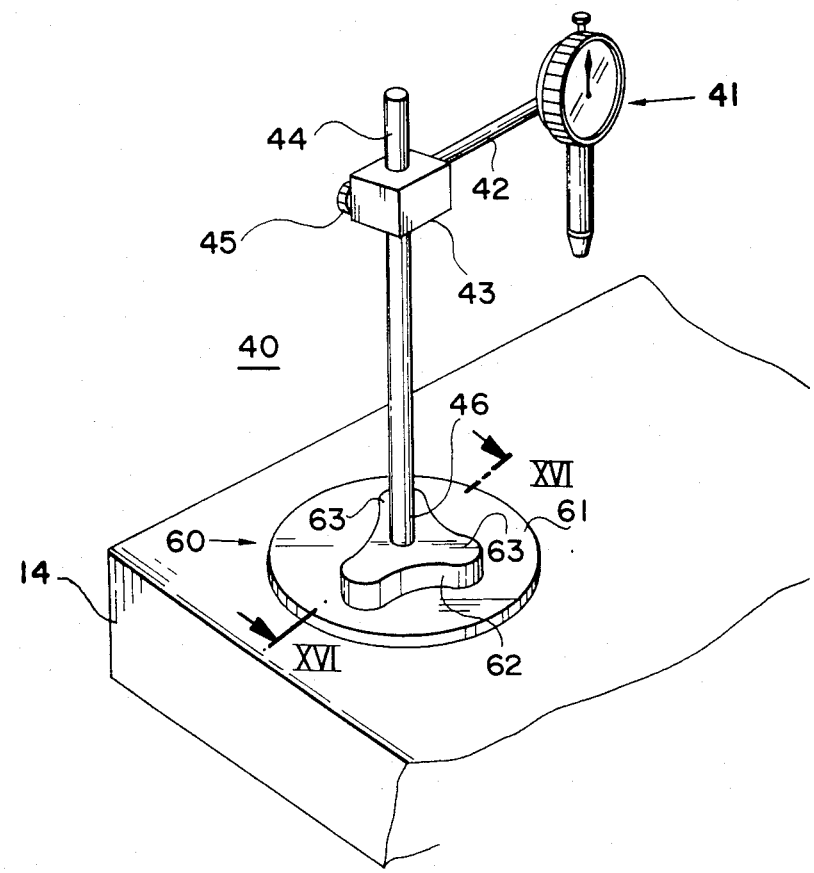
FIG. 15 is a perspective view diagrammatically illustrating a magnetic stand incorporating another embodiment of the invention in a magnetic base therein.
Figure 17:
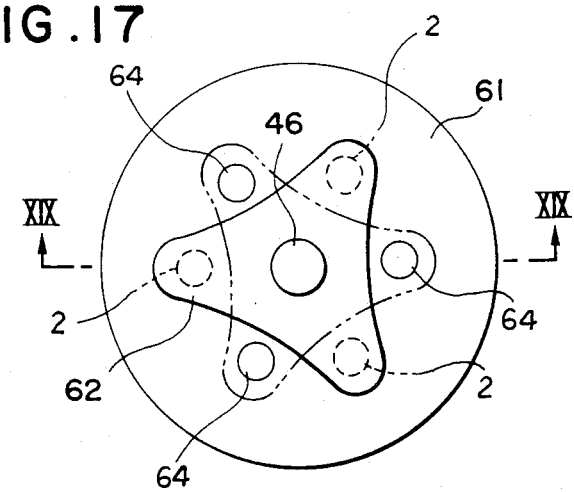
FIG. 17 is a top plan view of the magnetic base of FIG. 15 when it is substantially magnetically deactuated or weakened.

In FIG. 15 there is shown another magnetic retainer assembly 60 used as the base of a magnetic stand of the type described in connection with FIG. 10. The assembly 60 comprises a disk plate 61 of a non-magnetic material shown lying on a magnetizable object such as a workpiece 14 and an upper plate 62 having three projections 63 and accepting a lower end portion 46 of the post 44 through a center thereof, which portion extends into and is secured to the disk plate 61. The upper plate 62 is arranged in contact and coaxially with the disk plate 61 and is turnable on the post 46. Referring to FIGS. 16 and 17, the disk plate 61 has three permanent magnets 64 of a uniform size embedded therein at positions symmetrical about the post 46. Each permanent magnet 64 is in the form of a relatively thin disk. Likewise, the upper plate 62 has three permanent magnets 2 of a uniform size embedded in the regions of three projections 63 thereof, respectively, thus symmetrically about the post 46 and corresponding to the positions of the permanent magnets 64. Each permanent magnet 2 is in the form of a relatively thick disk having a diameter equal to that of each permanent magnet 64. Each permanent magnet 64 has its upper and lower pole faces flush with the upper and lower surfaces of the base disk plate 61, respectively, whereas each permanent magnet 2 has its lower pole face flush with the lower surface of the upper plate 62 and its upper pole face within the plate 62. Both permanent magnets 2 and 64 are composed of a same rare-earth/cobalt magnetic material. It is desirable that the permanent magnets 2 be at least two times as thick as the permanent magnets 64. The three projections 63 forming a Y-shape is provided for the upper plate 62 to ease the turning thereof with the operator's hand. The lower portion 46 of the post 44 is composed of a ferromagnetic material.

Figure 18:
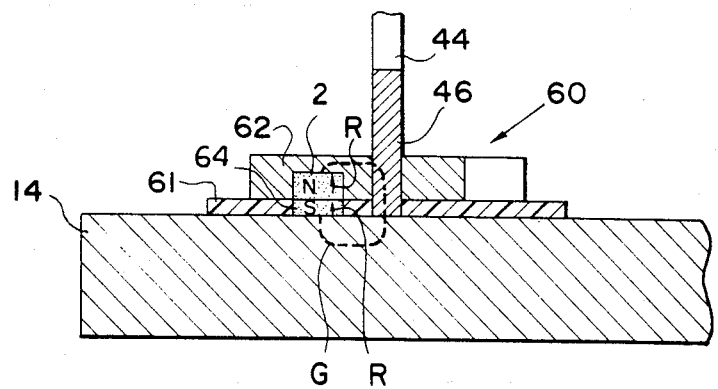
Figure 19:
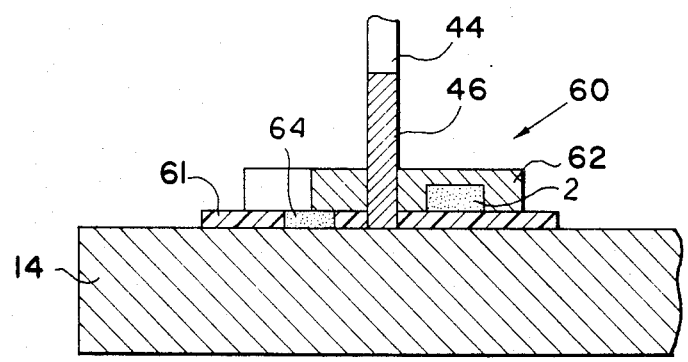
FIG. 19 is a similar view taken along the line XIX—XIX in FIG. 17.

It will be seen that when the rotary upper plate 62 is in such a position as to place each permanent magnet 2 therein immediately above the corresponding permanent magnet 64 in the base plate 61 as shown in FIG. 18, the direction of internal magnetic field of the permanent magnet 64 coincides with that of the permanent magnet 2 as shown by the arrow R whereby a composite permanent magnet of such intensified field strength is provided in contact with the magnetic object 14. At the same time, a closed magnetic circuit through the upper plate 62, the ferromagnetic portion of post 46 and the magnetic object 14 is established to allow the magnetic flux G from the composite magnet 2 plus 64 to pass therethrough, thereby firmly securing the assembly 60 to the magnetic object 14. When, however, the rotary upper plate 62 is turned to a position as shown in FIG. 17, the closed magnetic circuit is broken so that as is apparent also from FIG. 19, the permanent magnets 2 of a greater field strength become ineffective, allowing only permanent magnets 64 to be attracted with a limited force of magnetic attraction to the magnetic object 14 and thus permitting the assembly 60 to be readily detached from the object 14.

Figure 23:
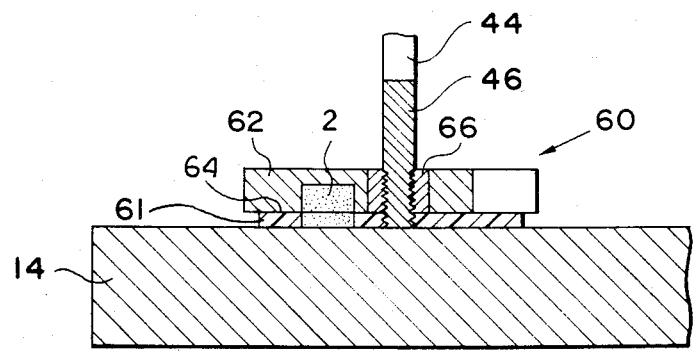
FIG. 23 is a side cross-sectional view of a modification of the structure of the magnetic base of FIG. 16.
Figure 20:
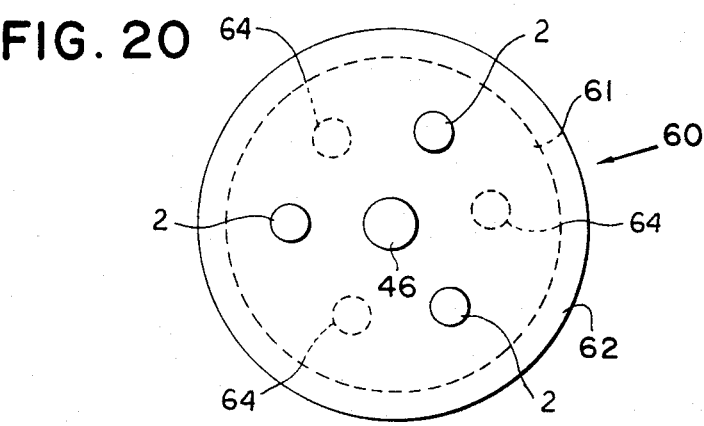
FIGS. 20–22 are top plan views of modifications of the magnetic base of FIG. 17.
Figure 21:
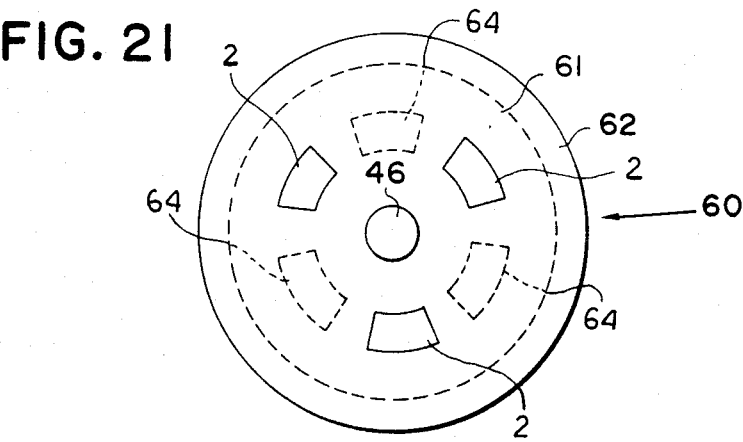
Figure 22:
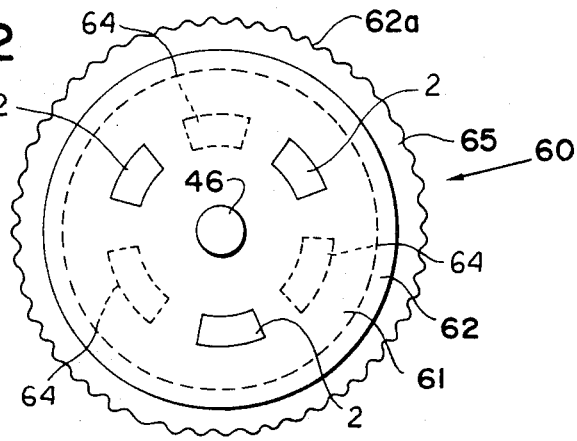
Figure 24:
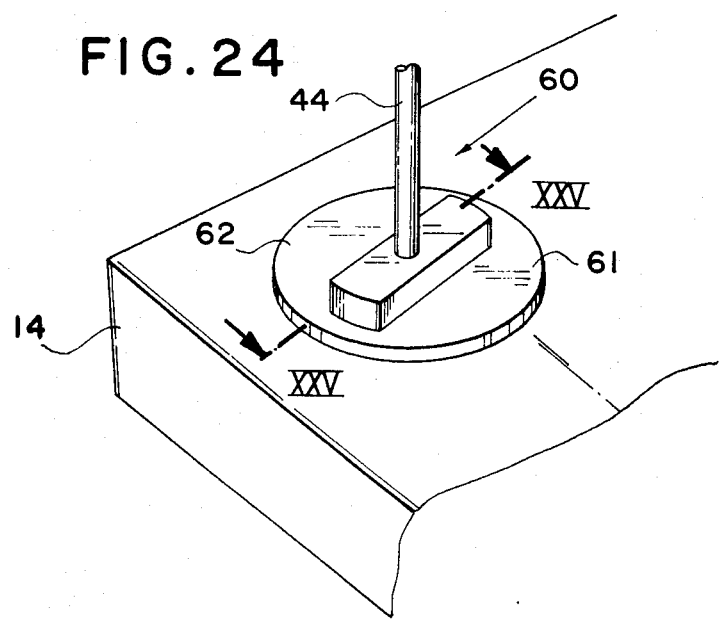
FIG. 24 is a perspective view diagrammatically illustrating a modification of the magnetic base of FIG. 15 according to the invention.
Figure 25:
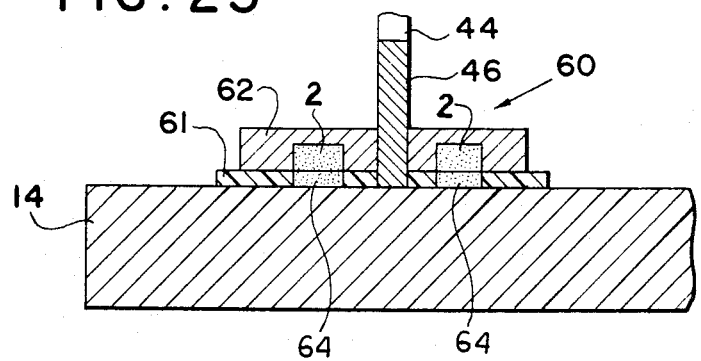
FIG. 25 is a side cross-sectional view of the magnetic base of FIG. 24 taken along the line XXV—XXV.
Figure 26:
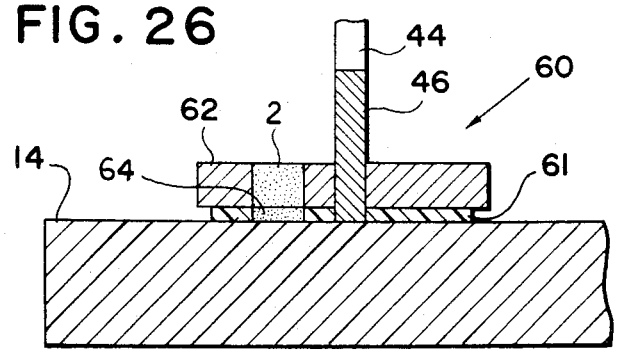
FIG. 26 is a silimar view illustrating a further modification of the structure of the magnetic base of FIG. 16.

FIGS. 20–26 shown various modifications of the magnetic base 60 for use with a magnetic stand or the like. Thus, the magnetic base 60 of FIG. 20 makes use of the upper plate 62 in the form of a circular disk with its diameter slightly greater than that of the base plate disk 61 to facilitate detachment of the assembly 60. In the arrangement of FIG. 21, the pole face of each base permanent magnet 64 and each upper permanent magnet 2 is enlarged in area to allow a greater force of magnetic attraction to be exerted thereby to the magnetic object 14. The magnetic base 60 of FIG. 22 employs an upper plate 62 fitted with a ring 65 having a knurled periphery 65a to ease the gripping by the operator. The ring 65 may be of a non-magnetic material such as a plastic which is readily machinable. FIG. 26 shows that the upper face of each permanent magnet 2 may be exposed from the upper plate or disk 62. In the arrangement of FIG. 23, the lower ferromagnetic portion 46 of the post 44 is threaded into the base disk 61 and secured thereto. To allow the upper plate or disk 62 to turn about the post 46, a ferromagnetic ring 66 is provided to receive the threaded lower portion 46 of the post 44 and secured thereto on the base disk 61. The upper plate or disk 62 is then arranged to be turnable on the ferromagnetic ring 66. In the arrangement of FIGS. 24 and 25, the upper plate 62 is rectangular in shape.

Figure 27:
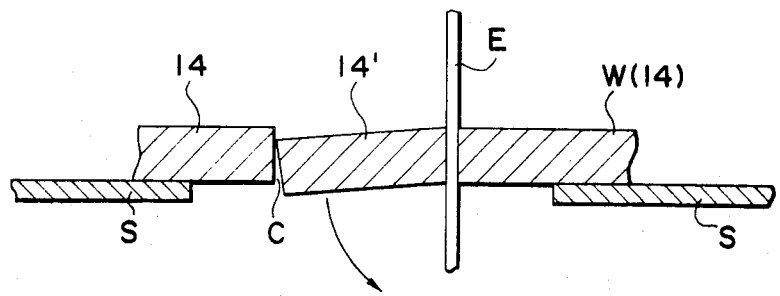
FIG. 27 is a side cross-sectional view diagrammatically illustrating a workpiece being cut with an electrode wire in a traveling-wire electroerosion machining operation whereby the workpiece is severed into a supported portion and an unsupported portion, the latter tending to drop by its own weight under the action of gravity.
Figure 28:
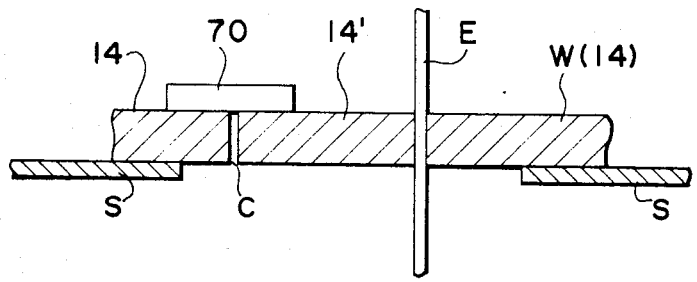
FIG. 28 is a similar view of the workpiece in which the supported and unsupported portions are bridged together with a permanent magnet according to the conventional practice.

A magnetic retainer assembly according to the invention is advantageously used, among other uses, to bridge two severed portions of a magnetizable object. In FIG. 27, there is shown a workpiece W being cut with an electrode wire E in a traveling-wire electroerosion machine and thereby progressively severed into two portions 14 and 14' across the progressively developing path of cut or cutting groove C. It is shown that the portion 14 remains supported on a support member S while the portion 14' becomes unsupported and tends to drop by its own gravity, thus leaving from the supported portion 14. The dropping portion, upon collision with the electrode wire E, causes a damaging short-circuiting and may even break it. Such inconvenience is avoided by placing, as shown in FIG. 28, on the workpiece W so as to bridge the two severed portions 14 and 14' a magnetic retainer assembly 70 of the invention especially adapted to this application.

The magnetic retainer assembly 70 (FIG. 29) according to the invention includes a plurality of permanent magnets 2 of a uniform size and shape composed, or a rare-earth/cobalt magnetic material. The permanent magnets 2 are cylindrical-columnar in shape and arranged uniformly over the floor 71a of a housing 71 composed of a non-magnetic material such as stainless steel or brass. Each permanent magnet 2 is here again retained in a cylindrical member 72 of a non-magnetic material such as a plastic which is in turn retained in a cup-shaped ferromagnetic member 73. The housing 71 is seated on the workpiece W in such a manner that its floor 71a bridges the supported portion 14 and the unsupported portion 14' across the cut groove C. The space within the housing 71 may be filled with a non-magnetic material to have the ferromagnetic members 73 embedded therein. The floor portion 71a of the housing 71 should be sufficiently thin to minimize the magnetic reluctance for the magnetic flux from each permanent magnet 2 to pass into the magnetic workpiece 14, 14' and through the ferromagnetic member 73 with a sufficient flux density to allow the assembly 70 to be firmly attracted to the workpiece. The housing 71 is provided with a handle 74 to be gripped by the operator for convenience. FIG. 30(B) shows a cross-section of each permanent magnet 2 and its surrounding non-magnetic cylinder 72 and cup-shaped ferromagnetic member 73 secured on the fllow portion 71a of the housing 70. It will be appreciated that the non-magnetic member 72 may be dispensed with and the ferromagnetic field-concentrator member 73 may be in the form of a U-shaped arm as is apparent from FIG. 30(A). The housing 71 composed of non-magnetic material is advantageously provided to prevent ferromagnetic machining chips from magnetically sticking on the assembly 70. In this manner, the possible reduction of the retention ability of the assembly 70 onto the workpiece 14, 14' is effectively prevented.

A magnetic retainer assembly 80 shown in FIG. 31 secured onto or retaining a magnetic object 14 comprises five parallel layers 81–85 of which the outermost and center layers 81, 82 and 83 are uniformly composed of a ferromagnetic substance such as an iron material. Each of the other two layers 84 and 85 incorporates a pair of permanent magnets 2 which may again be disk-shaped with their respective poles as shown. Each permanent magnet 2 is accommodated in a receptacle of a semi-magnetic material 86 which is in turn embedded in a non-magnetic substance constituting the layer 84, 85. The semi-magnetic material 86 is here again composed of an adhesive material having fine particles of a magnetic material uniformly distributed therein as previously described. The assembly 80 is completed with a thin layer 87 of a highhardness material such as titanium or titanium-nitride coated thereon. It is desirable that this layer be applied at least on the retention surface 88 of the assembly 80 to protect it against wear and abrasion. The layer 87 may be deposited on the surface by using electroplating, vapor deposition, sputtering or ion plating.

Figure 32:
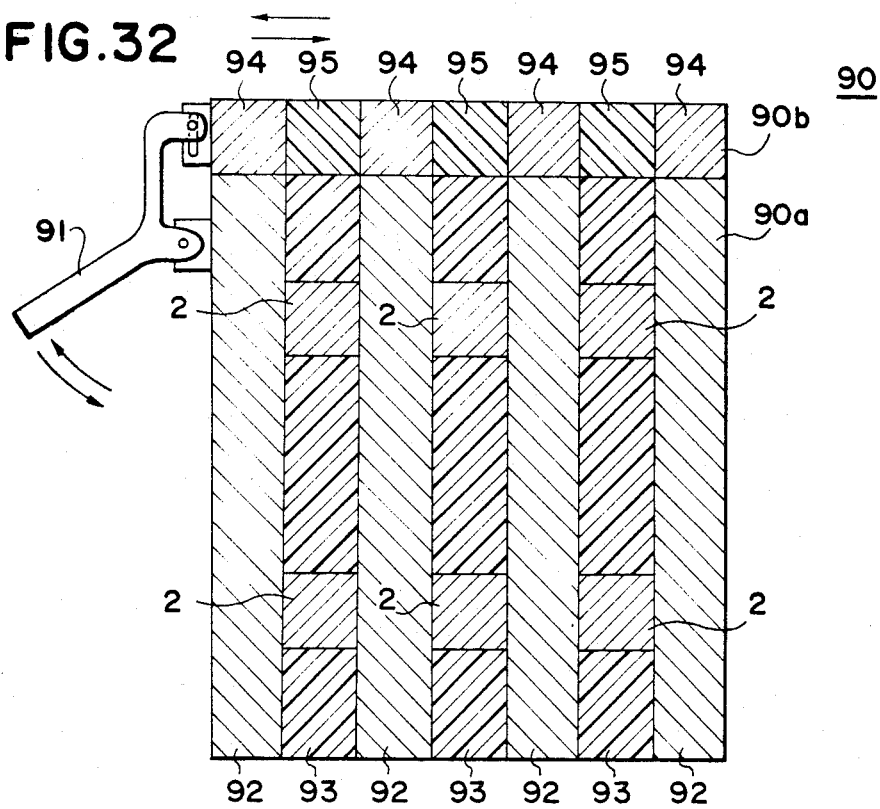
FIG. 32 is a longitudinal cross-sectional view of another magnetic retainer assembly embodying the present invention.
Figure 33:
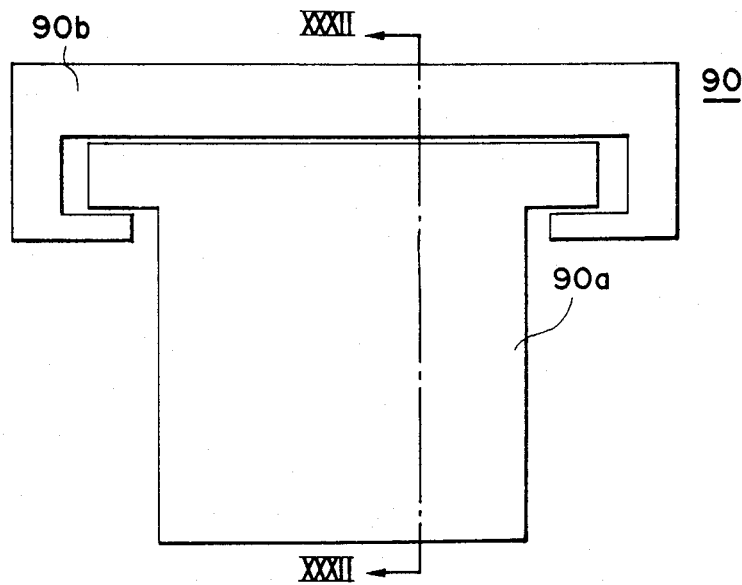
FIG. 33 is a side view of the assembly of FIG. 32.

A switchable magnetic assembly 90 shown in FIGS. 32 and 33 comprises a magnetic block 90a and a path-forming block 90b which are movable relative to each other while holding a sliding contact therebetween. The movement is generated by a handle 91. The magnetic block 90a comprises four layers 92 of a ferromagnetic substance and three layers 93 of a non-magnetic substance and three layers 93 of a non-magnetic substance in which permanent magnets 2 are embedded as shown. The path-forming block 90a likewise comprises four layers 94 of the ferromagnetic substance and three layers 95 of the non-magnetic substance as shown. When the two blocks 90b and 90b are positioned as shown in FIG. 32, each permanent magnet 2 in the magnetic block 90a maintains a closed magnetic circuit with a magnetic object (not shown) placed over the upper surface of the path-forming block 90b, thereby holding the object to be attracted on that surface and hence on the assembly 90. When the upper block 90b is displaced by the handle 91 so as to bring the non-magnetic layers 95 in the path-forming block 90b above the respective ferromagnetic layers 92 in the magnetic block 90a, the magnetic paths are broken to magnetically deactuate the assembly. A solid lubricant is desirably included at a proportion by volume from 5 to 15% in the non-magnetic layers 93 and 95 at least along their mutual contact surfaces and may include be molybdenum sulfide ($MoS_2$), tungsten sulfide ($WS_2$), titanium nitride (TiN), iron oxide ($Fe_2O_3$), graphite, graphite fluoride and boron nitride (BN). The non-magnetic substance constituting the layers 93 and 95 may be a synthetic resin, ceramic or non-magnetic metal (e.g. brass, copper). In addition, particles of aluminum oxide, boron nitride, silicon carbide, titanium carbide and/or tungsten carbide may be incorporated.

Figure 34:
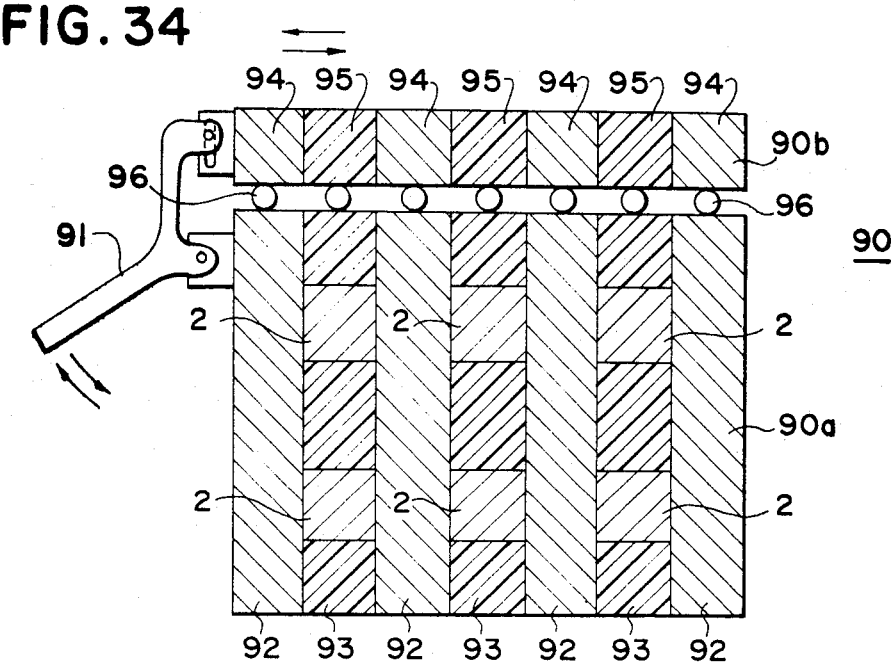
FIGS. 34 and 35 are views, similar to those of FIGS. 32 and 33, respectively, illustrating a modification of the assembly thereof.
Figure 35:
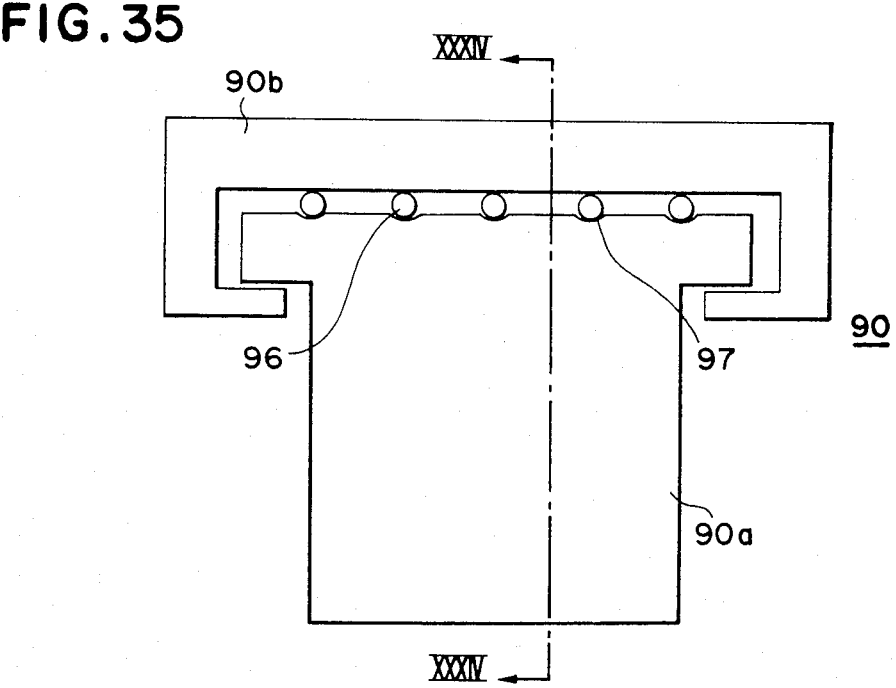
Figure 36:
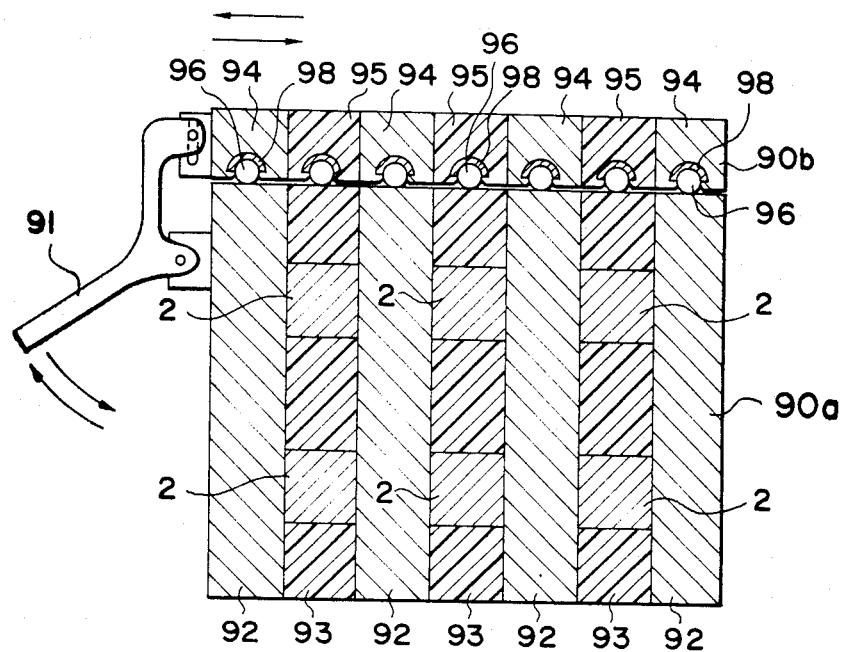
FIG. 36 is a view similar to that of FIG. 32 illustrating another modification of the assembly thereof.

In a modified arrangement of FIGS. 34 and 35, a multiplicity of bearing balls 96 are used between the opposed surfaces of the magnetic block 90a and the path-forming block 90b to improve the smoothness of the sliding motion between the two blocks. The balls 96 are retained in grooves 97 which are formed equi-distantly on the upper surface of the magnetic block 90a as shown in FIG. 35. Alternatively, as shown in FIG. 36, reception grooves 98 may be formed on the lower surface of the upper path-forming block 90b to retain balls 96 rotatably therein. It will be understood that the illustrated ball arrangement may be replaced by an arrangement utilizing a multiplicity of bearing rollers or rotatable bars.

The principles of the present invention can advantageously be applied in designing a deformable magnetic retainer assembly as well. It should be noted that conventional magnetic retainers have commonly employed a matrix of a deformable material such as rubber in which particles of a permanent magnetic material are uniformly distributed. With them, there has always been the dilemma that a satisfactory magnetic retention is obtainable only at the sacrifice of deformability and a significant deformabilty is obtainable at the loss of magnetic retention. Furthermore, even if both reasonable magnetic retentivity and deformability are present, the conventional retainer of this class tends to form cracks therein through repeated bending or elongation and is thus relatively short-lived. The invention thus provides a deformable magnetic retainer assembly which can withstand a high degree of deformation without forming cracks therein and is characterized by a prolonged life of service.

Figure 37:
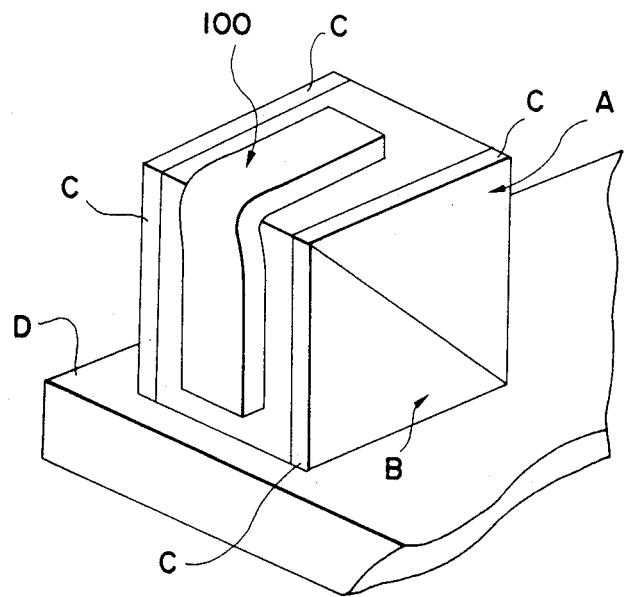
FIG. 37 is a perspective view diagrammatically illustrating a pair of pieces held together by a deformable magnetic retainer assembly according to the invention.

In FIG. 37, a pair of magnetizable blocks A and B are shown held together with a novel deformable magnetic retainer assembly 100 according to the invention and thereby held on a plate D. Side portions C of each block A, B may be non-magnetic. It is seen that the assembly 100 is deflected to form an angle of 90° or more. Such a high degree of deflection has been practically unrealistic with the conventional deformable magnetic retainer.

Figure 38:
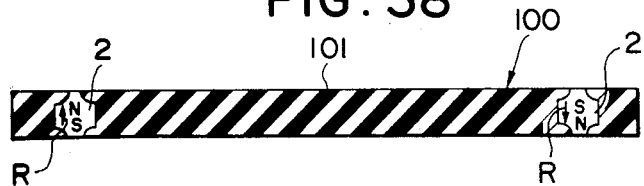
FIGS. 38–41 are cross-sectional views of different embodiments of the deformable magnetic retainer assembly seen in FIG. 37.

An embodiment of the assembly 100 shown in FIG. 38 comprises an elongate matrix of deformable material 101 uniformly composed of, say, rubber and a pair of permanent magnets 2 embedded at two end regions of the elongate matrix 101. Each permanent magnet 2 is shown having its axis of magnetization R perpendicular to the wider surfaces of the elongate matrix 101. Each permanent magnet 2 should preferably be shaped to be greater in diameter as its center zone between the N and S poles not to easily dislodge from the matrix 101. In this embodiment, the two magnets 2 are widely spaced apart and bridged only by the uniform deformable material of the matrix 101 so that the cracking problem may entirely be eliminated.

Figure 39:
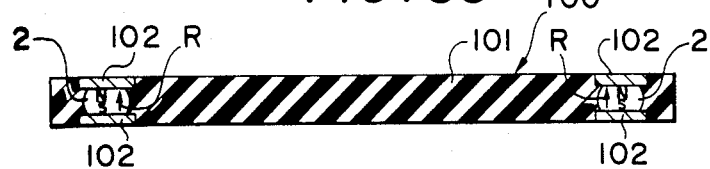
Figure 40:
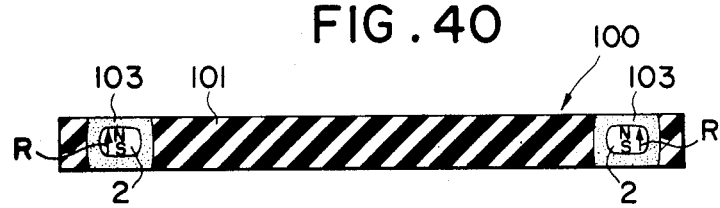
Figure 41:
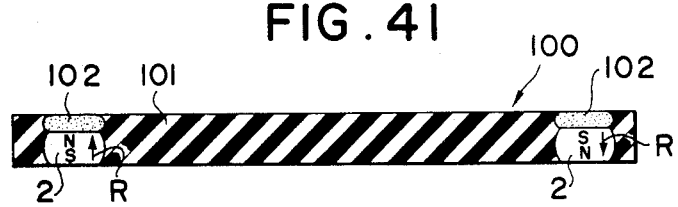
Figure 42A:
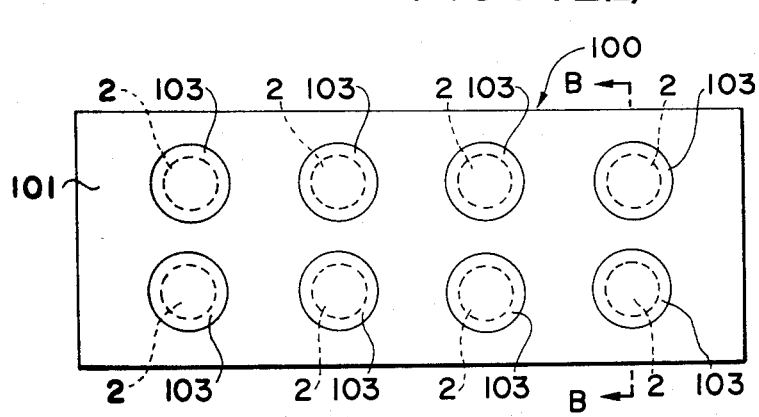
FIGS. 42(a) and 42(b) are a top plan view and sectional view, respectively, of a further embodiment of the deformable magnetic retainer assembly of the invention.
Figure 42B:
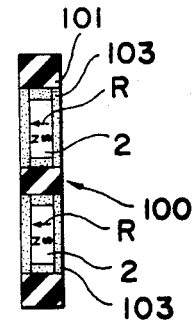
Figure 43:
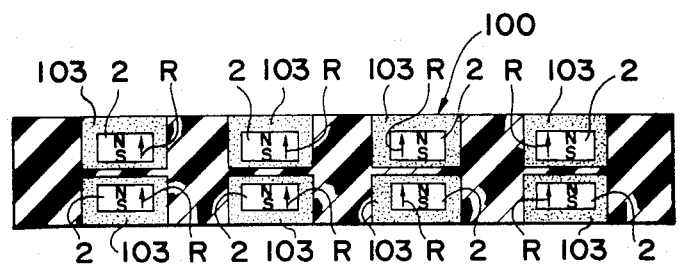
FIG. 43 is a side elevational view diagrammatically illustrating another embodiment of the magnetic retainer assembly of the same class.

The basic structure of the deformable magnetic retainer assembly 100 of FIG. 39 is improved by flanking or sandwiching each permanent magnet 2 embedded in the matrix 101 with two ferromagnetic or semi-magnetic plates 102 in contact with its opposed pole faces and exposed flush with the surfaces of the matrix 101. Each semi-magnetic plate 102 may be composed of a deformable material in which fine particles of a ferromagnetic material are uniformly distributed. The plate 102 advantageously serve to protect each permanent against wear end, when compound of semi-magnetic material, further serve to prevent demagnetization of each permanent magnet 2 as previously described. Similar improvements are achieved by embedding each permanent magnet 2 in a body of semi-magnetic material 103 as shown in FIG. 40 or by providing a single plate 102 in contact with one pole face (upper) of each permnent magnet 2. Permanent magnets 2 and their individually associated semi-magnetic bodies 103 may be arranged in the matrix 101 of uniform deformable material in a plurality of longitudinal or lateral rows as shown in FIGS. 42(a) and 42(b) or of vertical rows as shown in FIG. 43.

Figure 44:
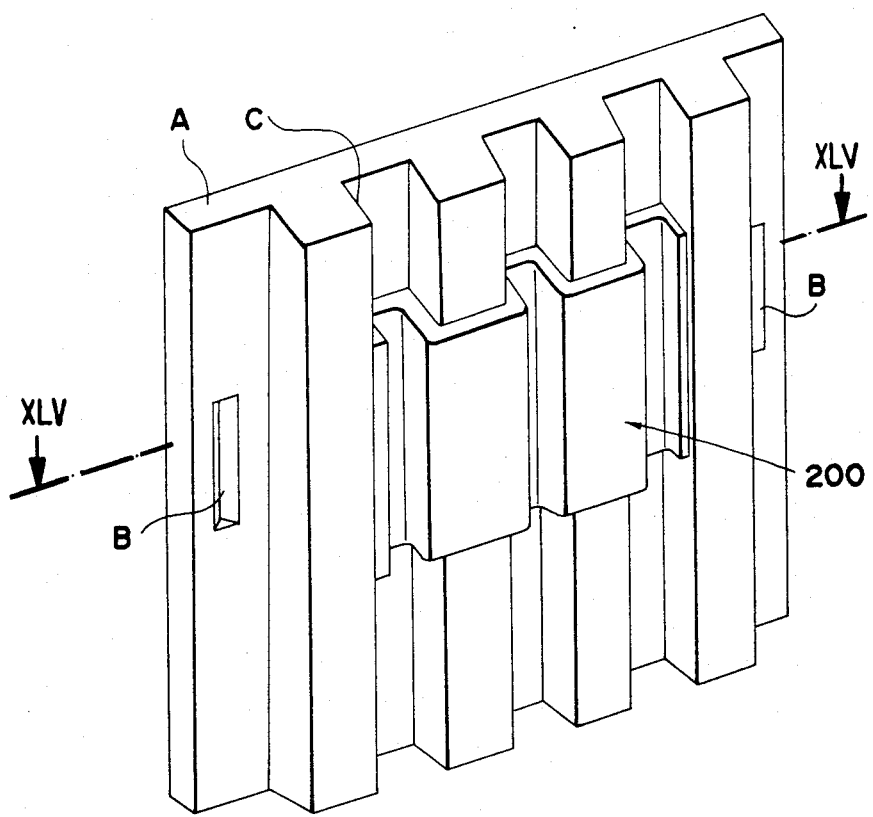
FIG. 44 is a perspective view illustrating a corrugated member being retained with a deformable magnetic retainer assembly according to the invention.
Figure 45:
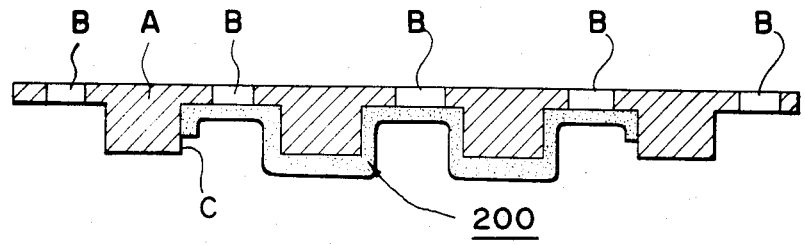
FIG. 45 is a cross-sectional view illustrating the assembly of FIG. 44 taken along the line XLV—XLV.
Figure 47:
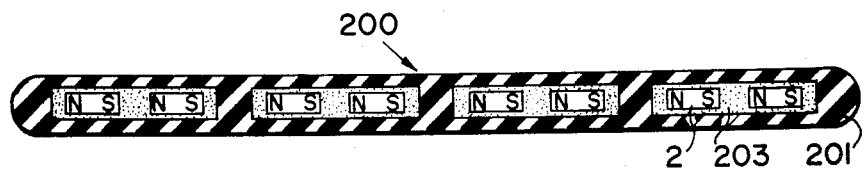
FIG. 47 is a cross-sectional view of the assembly of FIG. 46 taken along the line XLVII—XLVII.
Figure 48:
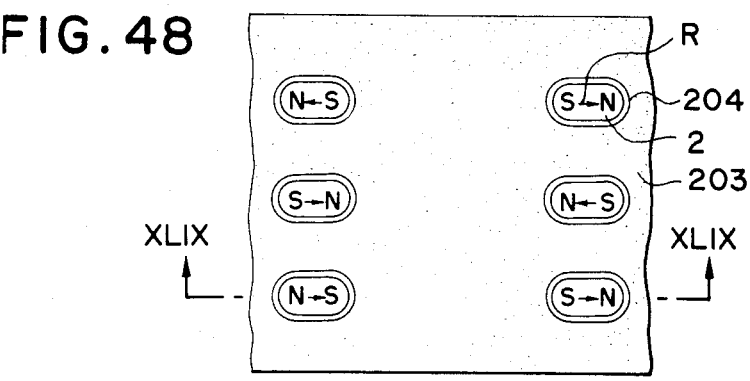
FIGS. 48 and 49 are similar views to those of FIGS. 46 and 47, respectively, of a further embodiment of the deformable magnetic retainer assembly of the invention.
Figure 49:
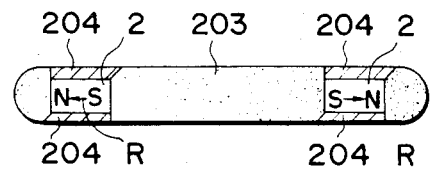

FIG. 44 shows a deformable magnetic retainer assembly 200 as applied to a corrugated ferromagnetic body A having a plurality of parallel elongate recesses C in each of which an elongate opening B is provided. The assembly 200 is deformed to closely conform to the recesses C' and the adjacent projections and is magnetically secured thereto while sealing up the openings B. A deformable magnetic retainer assembly is quite convenient because it eliminates the need for bolting and keeps a securable object free from contamination. The deformable magnetic retainer assembly 200 according to the invention may take the form diagrammatically shown in FIGS. 46 and 47. The assembly 200 shown comprises a matrix 201 composed uniformly of a deformable material of a high degree of deformability in which a multiplicity of sub-matrices 203 composed of a deformable material of a relatively low deformability are regularly distributed. Each sub-matrix 203 has a plurality of permanent magnets 2 regularly arranged therein. The double matrix structure assures both firm retention of permanent magnets 2 therein and due deformability of the assembly. Each permanent magnet 2 is preferably enclosed within a deformable semi-magnetic material 204 or sandwiched with a pair of plates 204 of deformable semi-magnetic as shown in FIGS. 48 and 49. The deformable semi-magnetic material consists of a deformable material in which fine magnetic particles are uniformy distributed.

Figure 50:
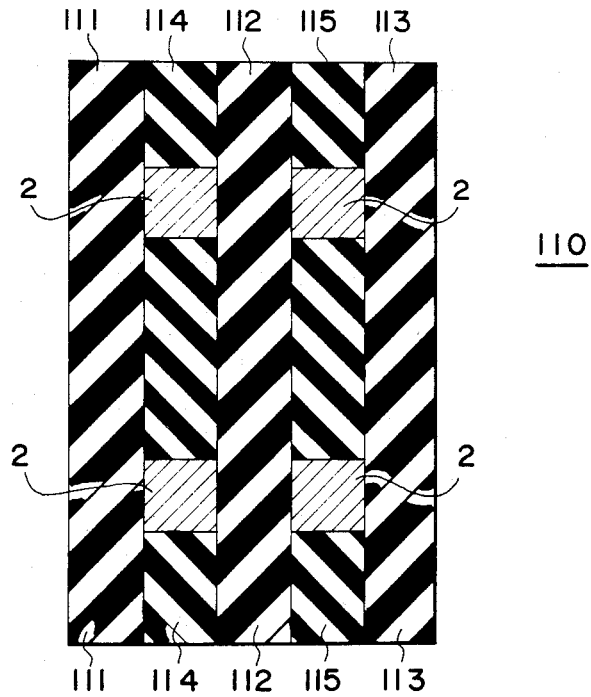
FIG. 50 is a longitudinal cross-sectional view illustrating a further embodiment of the invention.

A deformable magnetic retainer assembly 110 shown in FIG. 50 comprises five layers of which the outermost and center layers 111, 112 and 113 are composed of an elastomeric material with which particles, tapes, wool or fragments of a magnetic material are mixed. Intermediate layers 114 and 115 are composed of an elastomeric and non-magnetic material in which permanent magnets 2 are regularly arranged as shown. The elastomeric materials for use include natural rubber, SBR (butadiene-styrene rubber), neoprene rubber, nitrile rubber, polybutadiene rubber, polyisoprene rubber, silicon rubber, chlorosulfuric polyethylene rubber and elastomers of epoxy family and chloroprene family. The magnetic materials for use include iron-cobalt, iron-nickel, iron-cobalt-nickel, $Fe_2O_3$, nickel-iron-molybdenum (e.g. 79% Ni 17% Fe and 4% Mo by weight), silicon-aluminum-iron (e.g. 9.5% Si, 5.5% Al and 85% Fe) and nickel-aluminum-silicon-iron (e.g. 3.2% Ni, 1% Al, 6% Si and 86.2% Fe) alloys. The permanent and magnetic materials for use include iron-chromium-cobalt alloys, rare-earth/cobalt alloys (e.g. SmCo5 and Sm2Co17). The magnetic material for mixture with an elastomeric material may also be amorphous metallic tapes having a thickness of 0.1 to 1 micron. Examples of the amorphous magnetic metals include: 4.7% Fe—70.3% Co—15% Si, 3% Fe—72% Co—6% B—16% P, 4.2% Fe—61.6% Co—4.2% Ni, and 23% Nb—10% Si—15% B. The magnetic particles may be of a particle size ranging between 0.5 and 30 microns. The magnetic wool of a thickness ranging between 0.5 and 10 microns may be cut into fragments of a length ranging between 0.5 and 20 microns. The magnetic material may be included into the elastomeric material at a proportion of at least 2 or 3% by volume, usually between 5 and 30% by volume and up to 40% by volume.

What is claimed is:

1. A magnetic retainer assembly (1) for selectively securing thereto and detaching therefrom a magnetizable object (14), comprising:

a plurality of columnar permanent magnets (2) of a like shape and size, each of which is axially magnetized and has two opposed magnetic poles at its two axially opposite end faces, the magnets (2) being arranged respectively at predetermined positions regularly spaced apart and constituting a predetermined set in the assembly (1) so as to individually produce magnetic fluxes of a uniform strength emanating from one of said two axially opposite end faces and terminating at the other of said two axially opposite end faces of each of said columnar permanent magnets;

support means (5) having each of said permanent magnets (2) individually at least laterally embedded therein for holding said magnets (2) at said spaced-apart positions in an essentially magnetically insulating relationship with each other;

first magnetic-path forming means (7,12) associated with said support means (5) for magnetically connecting said opposed poles of each of said permanent magnets (2) individually with said magnetizable object (14) through a first magnetic circuit (12, 14, 7, 5) of a sufficiently low magnetic reluctance to cause said assembly (1) to be attached to said object (14) or vice versa; and second magnetic-path forming means (13) associated with said support means (5) for establishing, for each of said permanent magnets (2) and parallel to the first magnetic circuit thereof, a respective second magnetic circuit (13, 14, 7, 5) of a relatively high magnetic reluctance for shunting said first magnetic circuit when said object (14) is to be, or remains detached from said assembly, said permanent magnets (2) having their areas of magnetization essentially in parallel with one another.

2. An assembly according to claim 1 wherein said axes of magnetization are oriented to be substantially perpendicular to the surface of said assembly (1) to be engaged with said object (14).

3. An assembly according to claim 1 wherein said non-magnetic member (3) is retained in a first ferromagnetic member (5) constituting said first magnetic-path forming means and arranged securely in contact with one pole of each said permanent magnet (2) whose other pole is adapted for contact with a second ferromagnetic member (12) constituting said first magnetic-path forming means and adapted for contact with said magnetizable object (14) along a surface (15) thereof, thereby establishing said first magnetic circuit.

4. An assembly according to claim 3 wherein said second ferromagnetic member (12) includes a plurality of columnar formations (12) each bridging said other pole and said magnetizable object (14) for establishing said first magnetic circuit, said each columnar formation (12) being retained in a respective member (13) which is magnetically less conductive than said first and second ferromagnetic members (5, 12) to constitute said second magnetic-path forming means and which is adapted to separate said each formation (12) from the remainder (7) of said second ferromagnetic member while forming said second magnetic circuit.

5. An assembly according to claim 4 wherein each said magnetically less conductive member (13) comprises a semi-magnetic member composed of a magnetically nonconductive material in which a magnetically conductive material is distributed.

6. An assembly according to claim 4 wherein said first ferromagnetic member (5) is arranged in sliding contact with said second ferromagnetic member (12) so as to be slidably movable relative thereto, further comprising means (8) for moving said first ferromagnetic member (5) relative to said second ferromagnetic member (12) to bring said other pole in contact with said magnetically less conductive member (13), thereby permitting said magnetizable object (14) to be released from said assembly or vice versa while establishing said second magnetic circuit.

7. An assembly according to claim 6 wherein said first ferromagnetic member (5) is rectangular in shape and retained in a rectangular compartment (6) formed in said second ferromagnetic member (7) so as to be slidably movable therein and said moving means comprises handle means (8) passing through said second ferromagnetic member (7) and having one end portion fixed to said first ferromagnetic member (5) and the other end portion located outside said compartment (6).

8. An assembly according to claim 4 wherein each of said ferromagnetic columnar formations (12) is tapered so as to be divergent towards said magnetizable object (14).

9. An assembly according to claim 8, further comprising a tapered ring member (FIG. 4: 16) for fittedly accepting said tapered ferromagnetic columnar formation (12) therethrough within said magnetically less conductive member (13).

10. An assembly according to claim 3 when said second ferromagnetic member (FIGS. 1 to 4: 7; FIGS. 6 to 8: 21; FIG. 9: 31) comprises first and second portions separated by a continuous closed-loop groove (18; 23; 35, 36, 37) filled with a magnetically less conductive material (19, 26) constituting said second magnetic-path forming means and said plurality of permanent magnet members (2) are located adjacent to said first portion (12; 24; 32, 33, 34) at the inner side of said closed-loop groove.

11. An assembly according to claim 10 wherein said first ferromagnetic member (5, 22) is arranged in sliding contact with said second ferromagnetic member (7, 21, 31) so as to be slidably movable relative thereto, further comprising means (8) for moving said first ferromagnetic member relative to said second ferromagnetic member to bring each said other pole in contact with said magnetically less conductive member (19, 26) filling said groove (18; 23; 35, 36, 37), thereby permitting said magnetizable object (14) to be released from said assembly or vice versa while establishing said second magnetic circuit.

12. An assembly according to claim 11 wherein said first ferromagnetic member (5) is rectangular in shape and retained in a rectangular compartment (6) formed in said second ferromagnetic member (7) so as to be slidably movable therein and said moving means comprises handle means (FIG. 5: 8) passing through said second ferromagnetic member and having one end portion secured to said first ferromagnetic member and the other end portion located outside said compartment.

13. An assembly according to claim 10 wherein said continuous closed-loop groove (23; 35, 36, 37) has a plurality of projections (24a; 32a, 33a, 34a) defined by the periphery of said inner portion (24; 32, 33, 34) of the second ferromagnetic member, and said permanent magnets (2) are located adjacent to regions of said projections, respectively.

14. An assembly according to claim 13 wherein said first and second ferromagnetic members (FIGS. 6 to 8: 22, 21) are in the forms of disks arranged to be substantially coaxial with each other and relatively turnable about a common axis while holding a mutual sliding contact to bring said other pole in contact with said inner portion (24) to establish said first magnetic circuit, thereby permitting said assembly to be magnetically secured to said magnetizable object (14) and to bring said other pole in contact with said magnetically less conductive material (26) to establish said second magnetic circuit, thereby permitting said object (14) to be released from said assembly or vice versa.

15. An assembly according to claim 10 wherein said magnetically less conductive material (19, 26) is a semimagnetic member composed of a magneticaly non-conductive material having a magnetically conductive material distributed therein.

16. An assembly according to claim 10 wherein a plurality of such continuous closed-loop grooves (FIG. 9: 35, 36, 37) are formed in said second ferromagnetic member (31).

Figure 29:
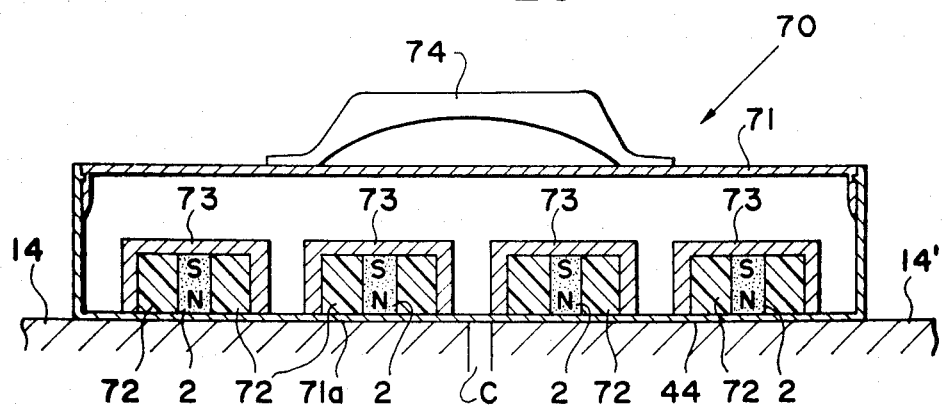
FIG. 29 is a side cross-sectional view of a magnetic retainer assembly embodying the present invention which may be used to bridge the two portions.
Figure 46:
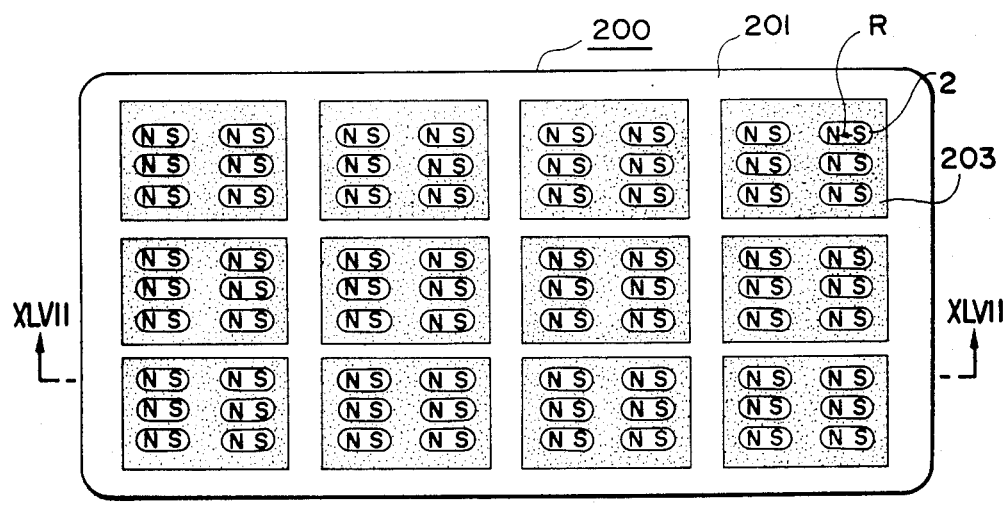
FIG. 46 is a top plan view diagrammatically illustrating a further embodiment of the deformable magnetic retainer assembly according to the invention.

17. An assembly according to claim 1 wherein each of said permanent magnets (2; FIG. 11: 2a, 2b, 2c) is flanked in said support member with a magnetically less conductive material (3; FIGS. 11 and 12: 3a, 3b, 3c; FIG. 13: in 54a, 54b, 54c; FIG. 14: in 55a, 55b, 55c; FIG. 29: 72; FIG. 31: 86; FIG. 40: 103; FIG. 46: 203, FIG. 48: 204).

18. An assembly according to claim 17 wherein said magnetically less conductive member (FIG. 11: 3a, 3b, 3c) is retained in a first ferromagnetic member (53a, 53b, 53c; FIGS. 12 and 13: 51', 51") constituting said first magnetic-path forming means and adapted for contact with said magnetizable object (14) and one pole of each of said plurality of permanent magnets (2a, 2b, 2c) is adapted for contact with said magnetizable object, further comprising a second ferromagnetic member (52) associated with said first ferromagnetic member so as to be slidably movable relative thereto to engage with the other pole of each of said permanent magnets and said first ferromagnetic member simultaneously to establish said first magnetic circuit with said magnetizable object, thereby magnetically securing said assembly (50; 50'; 50") to said object (14) and to disengage from said other pole, thereby permitting said object to be released from said assembly or vice versa while establishing said second magnetic circuit through said magnetically less conductive material (3a, 3b, 3c).

19. An assembly according to claim 18 wherein said first ferromagnetic member is retained in a nomagnetic disk (FIGS. 10 to 12: 51) constituting said support means and adapted for intimate contact with said surface of the magnetizable object (14) and said second ferromagnetic member comprises a ferromagnetic disk (52) arranged coaxially with said non-magnetic disk (51) so as to be turntable about a common axis while holding a sliding contact therebetween, said ferromagnetic disk (52) being formed with openings (52a, 52b, 52c) arranged symmetrically about said axis and corresponding in number to said permanent magnets (2a, 2b, 2c) whereby when each of said openings (52a, 52b, 52c) is located adjacent to said other pole of the corresponding permanent magnet, said assembly is essentially magnetically released from said magnetizable object while establishing said second magnetic circuit through said magnetically less conductive material and when said openings are located remote from said other poles of the permanent magnets, said first magnetic circuit is established for each said permanent magnet to magnetically secure said assembly to said object.

20. An assembly according to claim 18 wherein said first ferromagnetic member comprises a first ferromagnetic disk (FIGS. 13 and 14: 51', 51") constituting said first magnetic path forming means and adapted for intimate contact with said surface of the magnetizable object (14), and said second ferromagnetic member comprises a second ferromagnetic disk (52) arranged coaxially with said first ferromagnetic disk (51', 51") so as to be turntable about a common axis while holding a sliding contact therebetween, said second ferromagnetic disk (52) being formed with openings (52a, 52b, 52c) arranged symmetrically about said axis and corresponding in number to said permanent magnets (2a, 2b, 2c) whereby when each of said openings is located adjacent to said other pole of the corresponding permanent magnet, said assembly is essentially magnetically released from said magnetizable object while establishing said magnetic circuit through said magnetically less conductive material, and when said openings are located remote from said other poles of the permanent magnets, said first magnetic circuit is established for each of said permanent magnets to magnetically secure said assembly to said object.

21. An assembly according to claim 17 wherein said magnetically less conductive material (3; 3a–c; 54a–c; 55a–c; 72; 86; 103; 203; 204) comprises a semi-magnetic member composed of a magnetically nonconductive material having a magnetically conductive material distributed therein.

22. An assembly according to claim 2 wherein said permanent magnets (2) are retained in a ferromagnetic member (FIG. 18: 62), further comprising a like plurality of further permanent magnets (64) retained in a non-magnetic disk (61) adapted for contact with said magnetizable object (14) and constituting said support means symmetrically about a ferromagnetic shaft secured thereto constituting said first magnetic-path forming means and each of said further permanent magnets (64) having one pole adapted for contact with said magnetizable object (14) and the other pole arranged to be engageable with one pole of each or a respective one of the first-mentioned permanent magnets (2) to establish said first magnetic circuit with said magnetizable object (14) through said ferromagnetic shaft (46).

23. An assembly according to claim 22 wherein said ferromagnetic member (62) is arranged coaxially with said non-magnetic disk so as to be turnable about said shaft while holding a sliding contact therebetween, said turnable ferromagnetic member (62) having the first-mentioned permanent magnets (2) retained therein, said further permanent magnets (64) corresponding in number to the first-mentioned permanent magnets (2), each of said first-mentioned permanent magnets (2) being positioned in said turnable ferromagnetic member (62) so as to be capable of overlying on the corresponding further permanent magnets (64) and then coinciding its axis of magnetization with that of the overlaid further permanent magnets (64), thereby providing a composite permanent magnet of an added field strength while establishing said first magnetic path with said magnetizable object (14) through said ferromagnetic member (62) and said ferromagnetic shaft (46).

24. An assembly according to claim 1 wherein the support means is a housing (FIG. 29: 71) of non-magnetic material including a thin plate (71d) for contact with the object or objects (14, 14') to be magnetically attracted by the assembly, each of said permanent magnets (2) being in contact at one pole with said plate (71a) and at the other pole with a magnetic field concentrator member (73) which, with interposition of a magnetically less conductive material (72) constituting said second path-forming means, flanks or laterally surrounds the magnets (2) in a spaced-apart relationship and is in contact with said plate.

25. An assembly according to claim 1, comprising a plurality of alternate layers of magnetic and non-magnetic material (FIG. 31: 81, 82, 83; 84, 85, 86; FIG. 50: 111, 112, 113, 114, 115), the layers of nonmagnetic material (84, 85, 86; 114, 115) constituting said support means and incorporating said permanent magnets (2), each of said permanent magnets being flanked with a magnetically less conductive material (86) constituting said second-path forming means.

26. An assembly according to claim 25 wherein the layers of magnetic material (FIG. 50: 111, 112, 113) are composed of elastomeric material with which particles, tapes wool or fragments of magnetic material are mixed, and the layers of non-magnetic material (114, 115) are of an elastomeric material.

27. An assemby according to claim 26 wherein the elastomeric material includes natural rubber, butadienestyrene rubber, neoprene, rubber, nitrile rubber, polybutadiene rubber, polyisoprene rubber, silicon rubber, chlorosulfuric polyethylene rubber and elastomers of epoxy family or chloroprene family, and the magnetic material includes an iron-cobalt alloy, an iron-nickel alloy, an iron-cobalt-nickel alloy, $Fe_2O_3$, a nickel-iron-molybdenum alloy, a silicon-aluminum-iron alloy or a nickel-aluminum-silicon-iron alloy.

28. An assembly according to claim 25 wherein at least the face of the assembly to be in contact with the object is provided with a layer (FIG. 31: 87) of very hard material such as titanium or titanium-nitride, or with a titanium coating.

29. An assembly according to claim 25 wherein said alternate layers form a magnetic block (FIGS. 32 and 34: 90a) with which is associated a path-forming member (90b), the assembly including means (91) for the displacement of said block (90a) and member (90b) relative to each other.

30. An assembly according to claim 29, including means for facilitating the relative displacement of the block and member.

31. An assembly according to claim 30 wherein the facilitating means comprise a solid lubricant included at a proportion by volume of 5 to 15% in the non-magnetic layers at least along the contact interface between the block (90a) and member (90b).

32. An assembly according to claim 31 wherein the lubricant includes molybdenum sulfide ($MoS_2$), tungsten sulfide ($WS_2$), titanium nitride (TiN), iron oxide ($Fe_2O_3$), graphite, graphite fluoride or boron nitride (BN).

33. An assembly according to claim 30 wherein the means for facilitating the relative displacement include rolling bodies (FIGS. 34 and 35: 96) such as bearing balls, rollers or bars.

34. An assembly according to claim 1 wherein the support means is an elongate matrix (FIGS. 40 and 42: 101; FIGS. 46 to 49: 201) of deformable material capable of withstanding a high degree of deformation without forming cracks, such as rubber.

35. An assembly according to claim 34 wherein each of the permanent magnet members (2) has at least one face covered with a magnetic or semi-magnetic material (FIGS. 40, 42 and 43: 103; FIGS. 46 to 49: 204).

36. An assembly according to claim 1 wherein the support means is formed by a matrix of a deformable material (FIGS. 46 to 49: 201) of a high degree of deformability in which a plurality of sub-matrices (203) composed of a deformable material of a relatively low deformability are regularly distributed, each sub-matrix having a plurality of said permanent magnets (2) regularly arranged therein.

37. An assembly according to claim 36 wherein each permanent magnet (2) is enclosed in a deformable semi-magnetic material (FIG. 48: 204) or sandwiched between plates of deformable semi-magnetic material (FIG. 49: 204).

* * * * *